United States Patent
Lee

(10) Patent No.: US 12,105,988 B2
(45) Date of Patent: Oct. 1, 2024

(54) MEMORY CONTROLLER FOR REDUCING THE NUMBER OF ERROR BITS IN READ DATA AND MEMORY SYSTEM INCLUDING THE SAME

(71) Applicant: SK hynix Inc., Icheon (KR)

(72) Inventor: Jong Min Lee, Icheon (KR)

(73) Assignee: SK hynix Inc., Icheon (KR)

( * ) Notice: Subject to any disclaimer, the term of this patent is extended or adjusted under 35 U.S.C. 154(b) by 198 days.

(21) Appl. No.: 17/551,061

(22) Filed: Dec. 14, 2021

(65) Prior Publication Data
US 2022/0391133 A1 Dec. 8, 2022

(30) Foreign Application Priority Data
Jun. 7, 2021 (KR) ........................ 10-2021-0073674

(51) Int. Cl.
*G06F 3/00* (2006.01)
*G06F 3/06* (2006.01)
*G06F 11/08* (2006.01)

(52) U.S. Cl.
CPC .......... *G06F 3/0656* (2013.01); *G06F 3/0604* (2013.01); *G06F 3/0619* (2013.01); *G06F 3/0679* (2013.01); *G06F 11/08* (2013.01); *G06F 2206/1014* (2013.01)

(58) Field of Classification Search
CPC ....... G06F 3/0656; G06F 3/0619; G06F 11/08
See application file for complete search history.

(56) References Cited

U.S. PATENT DOCUMENTS

| | | | | |
|---|---|---|---|---|
| 2011/0072300 A1* | 3/2011 | Rousseau | ............. | G11C 16/105 711/E12.001 |
| 2015/0301944 A1* | 10/2015 | Lu | ........................ | G06F 12/1027 711/143 |
| 2019/0114236 A1* | 4/2019 | Han | .................... | G06F 15/7825 |
| 2021/0232946 A1* | 7/2021 | Saha | ........................ | G06F 3/061 |

FOREIGN PATENT DOCUMENTS

| KR | 10-0614639 B1 | 8/2006 |
|---|---|---|
| KR | 10-1058159 B1 | 8/2011 |
| KR | 10-2018-0026022 A | 3/2018 |
| KR | 10-2020-0039882 A | 4/2020 |

\* cited by examiner

*Primary Examiner* — Reginald G Bragdon
*Assistant Examiner* — Michael L Westbrook

(57) ABSTRACT

A memory system may include a memory device including a plurality of memory blocks, a buffer memory device, and a memory controller. The buffer memory device includes a read buffer configured to store the data read from the memory device and a keep buffer configured to store part of the read data. The memory controller operates to identify keeping data among data stored in the read buffer according to a number of error bits in the keeping data when it was read from the memory device, store the keeping data in the keep buffer, and remove the keeping data from the read buffer. The memory controller may store the keeping data in any one of the plurality of memory blocks based on information related to the keeping data.

18 Claims, 18 Drawing Sheets

FIG. 3

| BUFFER MAPPING INFORMATION |||||
|---|---|---|---|---|
| READ BUFFER MAPPING INFORMATION || | KEEP BUFFER MAPPING INFORMATION ||
| RB_ADDR 0 | B_ADDR A | | KB_ADDR 0 | |
| RB_ADDR 1 | B_ADDR B | | KB_ADDR 1 | |
| RB_ADDR 2 | B_ADDR C | | KB_ADDR 2 | |
| RB_ADDR 3 | B_ADDR D | | KB_ADDR 3 | |
| ⋮ | ⋮ | | ⋮ | ⋮ | ns
MEMORY CONTROLLER FOR REDUCING THE NUMBER OF ERROR BITS IN READ DATA AND MEMORY SYSTEM INCLUDING THE SAME

CROSS-REFERENCE TO RELATED APPLICATION

The present application claims priority under 35 U.S.C. § 119(a) to Korean patent application number 10-2021-0073674, filed on Jun. 7, 2021, which is incorporated herein by reference in its entirety.

BACKGROUND

1. Technical Field

Various embodiments of the present disclosure relate to an electronic device, and more particularly to a memory controller and a memory system including the memory controller.

2. Related Art

A memory system is a device which stores data under the control of a host device such as a computer or a smartphone. The memory system may include a memory device in which data is stored and a memory controller which controls the memory device. Such memory devices are classified into volatile memory devices and nonvolatile memory devices.

Volatile memory devices are memory devices in which data is stored only when power is supplied and in which stored data is lost when the supply of power is interrupted. Examples of volatile memory devices include static random access memory (SRAM) and dynamic random access memory (DRAM).

Nonvolatile memory device are memory devices in which stored data is retained even when the supply of power is interrupted. Examples of nonvolatile memory devices include read only memory (ROM), a programmable ROM (PROM), electrically programmable ROM (EPROM), electrically erasable and programmable ROM (EEPROM), and flash memory.

SUMMARY

Various embodiments of the present disclosure are directed to a memory controller that can reduce the number of error bits in data read from a memory device, and a memory system including the memory controller.

An embodiment of the present disclosure may provide for a memory system. The memory system may include a memory device including a plurality of memory blocks, a buffer memory device including a read buffer configured to store data read from the memory device and a keep buffer configured to store part of the read data, and a memory controller configured to control the memory device and the buffer memory device, store the data read from the memory device in the read buffer, identify keeping data included in the data stored in the read buffer by determining whether, a number of error bits in the data stored in the read buffer is greater than a preset first reference number of error bits, transfer the keeping data from the read buffer to the keep buffer, and when information related to the keeping data satisfies a criteria, store the keeping data in any one of the plurality of memory blocks.

An embodiment of the present disclosure may provide for a memory controller for controlling a buffer memory device and a memory device including a plurality of memory blocks. The memory controller may include an operation controller configured to control the memory device to read data from the memory device in response to a request by a host to read the data, an error corrector configured to detect error bits included in the read data, and perform an error correction operation on the read data to produce error-corrected data, and a buffer controller configured to control the buffer memory device to store the read data in a read buffer included in the buffer memory device, and determine that data stored in the read buffer is keeping data when the data included a number of error bits greater than a reference number of error bits when the data was read from the memory device, and transfer the keeping data from the read buffer to a keep buffer included in the buffer memory device, and the operation controller is further configured to provide the error-corrected data to the host, and when information related to the keeping data satisfies a criteria, store the keeping data in any one of the plurality of memory blocks.

An embodiment of the present disclosure may provide for a memory system. The memory system may include a memory device configured to store data, a buffer memory device configured to store data read from the memory device, and a memory controller configured to provide the read data to a host, and thereafter control the memory device and the buffer memory device so that remaining data other than part of the read data is removed from the buffer memory device and the part of the read data is stored in the memory device.

BRIEF DESCRIPTION OF THE DRAWINGS

FIG. 3 illustrates buffer mapping information.

DETAILED DESCRIPTION

Specific structural or functional descriptions in the embodiments of the present disclosure introduced in this specification or application are provided to describe embodiments according to the concept of the present disclosure. The embodiments according to the concept of the present disclosure may be practiced in various forms, and should not be construed as being limited to the embodiments described in the specification or application.

Figure 1:
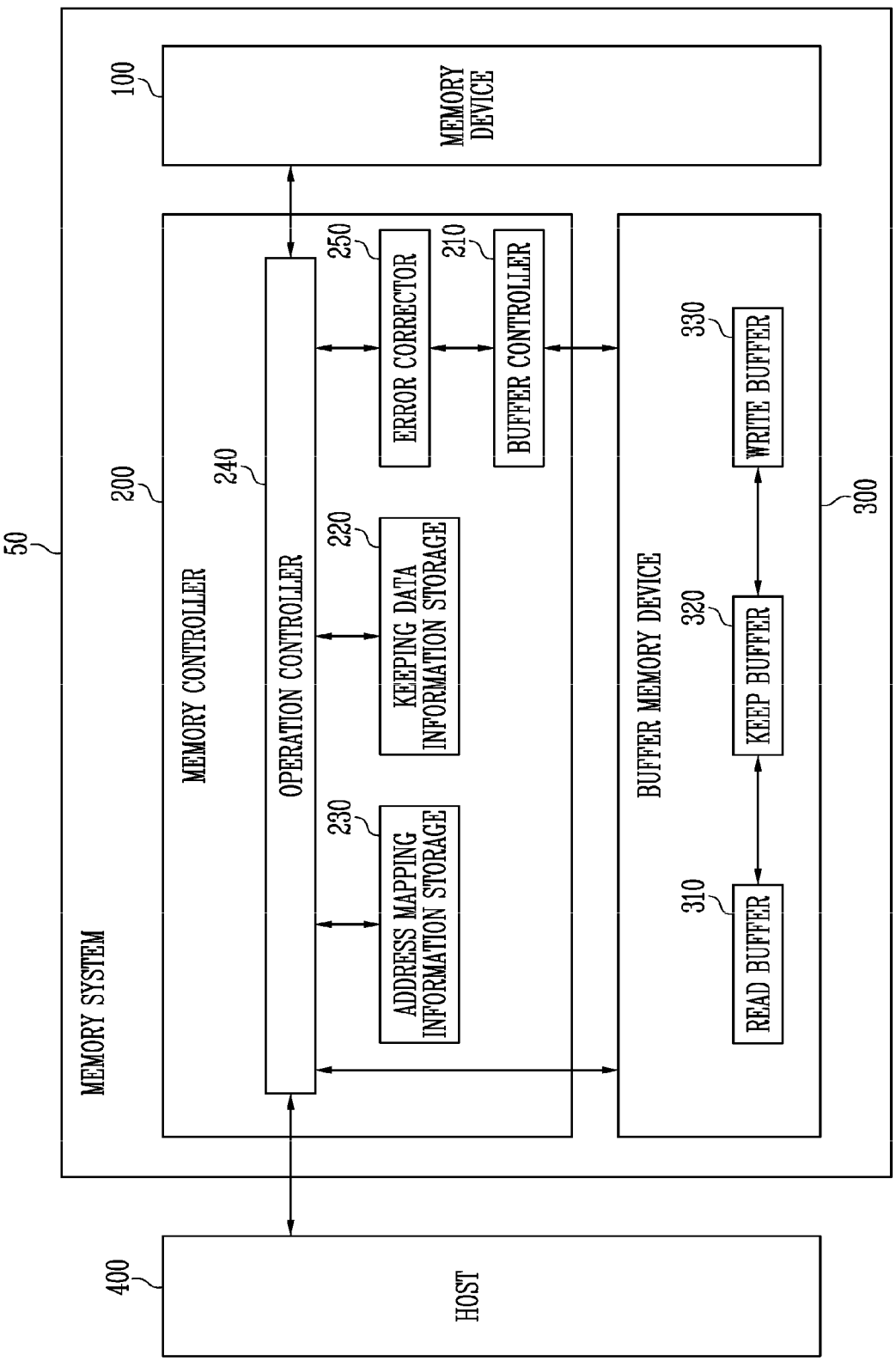
FIG. 1 illustrates a memory system according to an embodiment of the present disclosure.

FIG. 1 illustrates a memory system 50 according to an embodiment of the present disclosure.

The memory system 50 may include a memory device 100, a buffer memory device 300, and a memory controller 200 which controls the operation of the memory device 100 and the buffer memory device 300. The memory system 50 may be a device which stores data under the control of a host 400. The host 400 may be, for example, a mobile phone, a smartphone, an MP3 player, a laptop computer, a desktop computer, a game console, a TV, a tablet PC, or an in-vehicle infotainment system.

The memory system 50 may be manufactured as any one of various types of storage devices depending on a host interface that is a scheme for communication with the host 400. For example, the memory system 50 may be implemented as any one of, for example, a solid state drive (SSD), a multimedia card such as an MMC, an embedded MMC (eMMC), a reduced size MMC (RS-MMC), or a micro-MMC, a secure digital card such as an SD, a mini-SD, or a micro-SD, a universal serial bus (USB) storage device, a universal flash storage (UFS) device, a personal computer memory card international association (PCMCIA) card-type storage device, a peripheral component interconnection (PCI)-card type storage device, a PCI express (PCI-E) card-type storage device, a compact flash (CF) card, a smart media card, and a memory stick.

The memory system 50 may be manufactured in any one of various types of package forms. For example, the memory system 50 may be manufactured in any one of a package on package (POP), a system in package (SIP), a system on chip (SOC), a multi-chip package (MCP), a chip on board (COB), a wafer-level fabricated package (WFP), and a wafer-level stack package (WSP).

The memory device 100 may store data. The memory device 100 may operate in response to the control of the memory controller 200. The memory device 100 may include a memory cell array (not illustrated) including a plurality of memory cells which store data.

Each of the memory cells may be implemented as a single-level cell (SLC) capable of storing one data bit, a multi-level cell (MLC) capable of storing two data bits, a triple-level cell (TLC) capable of storing three data bits, or a quad-level cell (QLC) capable of storing four data bits.

The memory cell array (not illustrated) may include a plurality of memory blocks. Each memory block may include a plurality of memory cells. A single memory block may include a plurality of pages. In an embodiment, a page may be a unit by which data is stored in the memory device 100 or by which data stored in the memory device 100 is read. A memory block may be a unit by which data is erased.

In an embodiment, the memory device 100 may include, for example, a double data rate synchronous dynamic random access memory (DDR SDRAM), a low power double data rate fourth generation (LPDDR4) SDRAM, a graphics double data rate (GDDR) SDRAM, a low power DDR (LPDDR) SDRAM, a Rambus dynamic random access memory (RDRAM), a NAND flash memory, a vertical NAND flash memory, a NOR flash memory device, a resistive RAM (RRAM), a phase-change RAM (PRAM), a magnetoresistive RAM (MRAM), a ferroelectric RAM (FRAM), a spin transfer torque RAM (STT-RAM), or combinations thereof. In the present specification, for convenience of description, a description will be made on the assumption that the memory device 100 is a NAND flash memory.

The memory device 100 may receive a command and an address from the memory controller 200, and may access the area of the memory cell array selected by the address. The memory device 100 may perform an operation indicated by the command on the area selected by the address. For example, the memory device 100 may perform a write operation (i.e., a program operation), a read operation, and an erase operation. During the write operation, the memory device 100 may program data to the area selected by the address. During the read operation, the memory device 100 may read data from the area selected by the address. During the erase operation, the memory device 100 may erase data stored in the area selected by the address.

In an embodiment, the memory device 100 may store map data including mapping information between a logical address provided by the host 400 and a physical address corresponding to the logical address.

The memory controller 200 may control the overall operation of the memory system 50.

When power is applied to the memory system 50, the memory controller 200 may run firmware (FW). When the memory device 100 is a flash memory device, the firmware may include a host interface layer (HIL) which controls communication with the host 400, a flash translation layer (FTL) which controls communication between the host 400 and the memory device 100, and a flash interface layer (FIL) which controls communication with the memory device 100.

In an embodiment, the memory controller 200 may receive data and a logical block address (LBA) from the host 400, and may translate the logical block address (LBA) into a physical block address (PBA) indicating the address of memory cells which are included in the memory device 100 and in which the data is stored or is to be stored. In the present specification, the terms "logical block address (LBA)" and "logical address" may be used interchangeably. In the present specification, the terms "physical block address (PBA)" and "physical address" may be used interchangeably.

The memory controller 200 may control the memory device 100 so that a write operation, a read operation, or an erase operation is performed in response to a request received from the host 400. During the write operation, the memory controller 200 may provide a write command, a physical block address, and data to the memory device 100. During the read operation, the memory controller 200 may provide a read command and a physical block address to the memory device 100. During the erase operation, the memory controller 200 may provide an erase command and a physical block address to the memory device 100.

In an embodiment, the memory controller 200 may autonomously generate a command, an address, and data regardless of whether a request from the host 400 is received, and may transmit them to the memory device 100. For example, the memory controller 200 may provide the memory device 100 with commands, addresses, and data in order to perform read operations and write operations that are involved in performing wear leveling, read reclaim, garbage collection, etc.

In an embodiment, the memory controller 200 may control at least two memory devices 100. In this case, the memory controller 200 may control the memory devices 100 according to an interleaving scheme in order to improve operating performance. The interleaving scheme may be a scheme for controlling the memory devices 100 so that the operations of at least two memory devices 100 are caused to overlap each other in time.

In an embodiment, the memory controller 200 may include a buffer controller 210, a keeping data information storage 220, an address mapping information storage 230, an operation controller 240, and an error corrector 250.

The buffer controller 210 may control the buffer memory device 300 to temporarily store data that has been read from the memory device 100 or data provided by the host 400 that is to be written to the memory device 100.

In an embodiment, the buffer controller 210 may store buffer mapping information. The buffer mapping information may be information indicating mapping relationships between each of a read buffer address, a keep buffer address, and a write buffer address and a respective physical address of data stored (or to be stored) in the buffer memory device 300. The buffer controller 210 may store data in any of the read buffer 310, the keep buffer 320, and the write buffer 330, or may release the stored data by updating the buffer mapping information.

In an embodiment, the buffer controller 210 may control the buffer memory device 300 so that the data read from the memory device 100 is stored in the read buffer 310. When the read data is stored in the read buffer 310, the buffer controller 210 may store a read buffer address corresponding to the read data in the buffer mapping information.

In an embodiment, the buffer controller 210 may control the buffer memory device 300 so that part of the data stored in the read buffer 310 is stored in the keep buffer 320. In detail, the buffer controller 210 may determine keeping data from the data stored in the read buffer 310. For example, the buffer controller 210 may determine data stored in the read buffer 310 that, before correction by the error corrector 250, contained a number of error bits greater than a preset first reference number of error bits to be keeping data. The buffer controller 210 may control the buffer memory device 300 so that the keeping data stored in the read buffer 310 is moved to the keep buffer 320. For example, when the keeping data is stored in the keep buffer 320, the buffer controller 210 may update the buffer mapping information so that a read buffer address corresponding to the keeping data is transformed into a keep buffer address corresponding to the keeping data.

Thereafter, the buffer controller 210 may control the buffer memory device 300 to remove the data stored in the read buffer 310. The buffer controller 210 may update the buffer mapping information so that the read buffer address corresponding to the keeping data is removed.

The buffer controller 210 may control the buffer memory device 300 so that data that the host 400 has requested to be written is stored in the write buffer 330. In an embodiment, the buffer controller 210 may control the buffer memory device 300 so that keeping data having the same logical address as the logical address corresponding to the data requested to be written is removed from the keep buffer 320.

The keeping data information storage 220 may store information related to the keeping data. Here, the information related to the keeping data may include information about a residual space of the keep buffer 320, information about the time elapsed since the storage of the keeping data in the keep buffer 320, information about the number of error bits contained in the keeping data before the error bits were corrected, etc. The keeping data information storage 220 may provide the information related to the keeping data to the operation controller 240.

The address mapping information storage 230 may store address mapping information. Here, the address mapping information may include mapping relationships between logical addresses provided by the host 400 and physical addresses indicating the addresses of memory cells included in the plurality of memory blocks of the memory device 100. When a read request or a write request is received from the host 400, the address mapping information storage 230 may provide the address mapping information to the operation controller 240. The operation controller 240 may acquire a physical address mapped to the logical address provided by the host 400 based on the address mapping information. The operation controller 240 may perform an operation corresponding to the request from the host based on the acquired physical address.

Further, the address mapping information storage 230 may update the address mapping information when new data is stored in the memory device 100 or when the data stored in the memory device 100 is stored again at another location.

In an embodiment, when the keeping data is stored in the memory device 100, the address mapping information storage 230 may update the address mapping information so that the logical address corresponding to the keeping data is mapped to a physical address corresponding to memory cells into which the keeping data is being stored. In an example, when the keeping data is stored in any one of the plurality of memory blocks included in the memory device 100, the address mapping information storage 230 may receive the logical address corresponding to the keeping data from the operation controller 240. Further, the address mapping information storage 230 may update the address mapping information so that the logical address corresponding to the keeping data is mapped to a physical address corresponding to memory cells in which the keeping data is being stored, among the memory cells included in any one memory block.

The operation controller 240 may store data in the memory device 100 or read the data stored in the memory device 100 in response to a request received from the host 400.

For example, in response to a read request received from the host 400, the operation controller 240 may read the data stored in the memory device 100 and provide the read data to the error corrector 250. The operation controller 240 may then receive error-corrected data from the error corrector 250, and may provide the error-corrected data to the host 400. Furthermore, the operation controller 240 may provide the read data to the buffer memory device 300. The buffer memory device 300 may store the read data in the read buffer 310.

Furthermore, the operation controller 240 may store data in the memory device 100 in response to a write request received from the host 400. The operation controller 240 may provide data requested to be written to the buffer memory device 300. The buffer memory device 300 may store the data requested to be written in the write buffer 330.

In an embodiment, the operation controller 240 may control the memory device 100 so that the keeping data stored in the keep buffer 320 is stored in the memory device 100. The operation controller 240 may be provided with information related to the keeping data from the keeping data information storage 220. The operation controller 240 may determine, based on the information related to the keeping data, whether the keeping data is to be stored in the memory device 100. For example, when the information related to the keeping data exceeds a preset threshold value, the operation controller 240 may control the memory device 100 so that the keeping data is stored in any one of the plurality of memory blocks of the memory device 100.

In an embodiment, the operation controller 240 may control the memory device 100 so that the keeping data is stored in any one of the plurality of memory blocks during an idle time, using a background operation, or the like.

The error corrector 250 may detect error bits included in the data read from the memory device 100, and may perform an error correction operation on the read data. The error corrector 250 may provide error-corrected data to the operation controller 240. The error corrector 250 may provide information about the number of error bits included in the read data to the buffer controller 210.

The buffer memory device 300 may temporarily store the data read from the memory device 100 or the data that the host 400 has requested to be written under the control of the memory controller 200.

In an embodiment, the buffer memory device 300 may include the read buffer 310, the keep buffer 320, and the write buffer 330.

The read buffer 310 may temporarily store the data read from the memory device 100. The read data stored in the read buffer 310 may be error-corrected read data produced by the error corrector 250.

The keep buffer 320 may store the keeping data. In an embodiment, the keep buffer 320 may store the keeping data that is included in the data stored in the read buffer 310.

The write buffer 330 may temporarily store data that the host 400 has requested to be written.

In an embodiment, the buffer memory device 300 may be composed of heterogeneous memories. For example, the read buffer 310, the keep buffer 320, and the write buffer 330 may be implemented as different types of memories.

Over time, the number of error bits in the data stored in the memory device 100 may increase in proportion to the time during which the data has been stored. Causes for the increased number of error bits may include, for example, a phenomenon in which electrons stored in the memory device are ejected from the memory device over time, or in which electrons are injected during a read operation into a memory cell on which the read operation is not being performed. In this case, the memory system 50 may store pieces of data currently stored in a memory block of the memory device 100 in another memory block of the memory device 100 through a refresh operation such as a read reclaim operation, thus decreasing the probability of error occurrence during a read operation. However, when the number of error bits contained in the data is small, a refresh operation may not be performed. However, when a refresh operation occurs frequently, the performance of the memory system may deteriorate. Therefore, a scheme that is capable of decreasing the probability of error occurrence during a read operation and improving the performance of the memory system is required.

Therefore, in accordance with an embodiment of the present disclosure, keeping data corresponding to read data having a large number of error bits before being corrected may be temporarily stored in the keep buffer 320, and may be subsequently stored back into the memory device 100. In this manner, the probability of error occurrence during a subsequent read operation may be reduced.

The host 400 may communicate with the memory system 50 using at least one of various communication technologies such as universal serial bus (USB), Serial AT Attachment (SATA), serial attached SCSI (SAS), high speed interchip (HSIC), small computer system interface (SCSI), peripheral component interconnection (PCI), PCI express (PCIe), non-volatile memory express (NVMe), universal flash storage (UFS), secure digital (SD), multimedia card (MMC), embedded MMC (eMMC), dual in-line memory module (DIMM), registered DIMM (RDIMM), and load reduced DIMM (LRDIMM) communication technologies.

Figure 2:
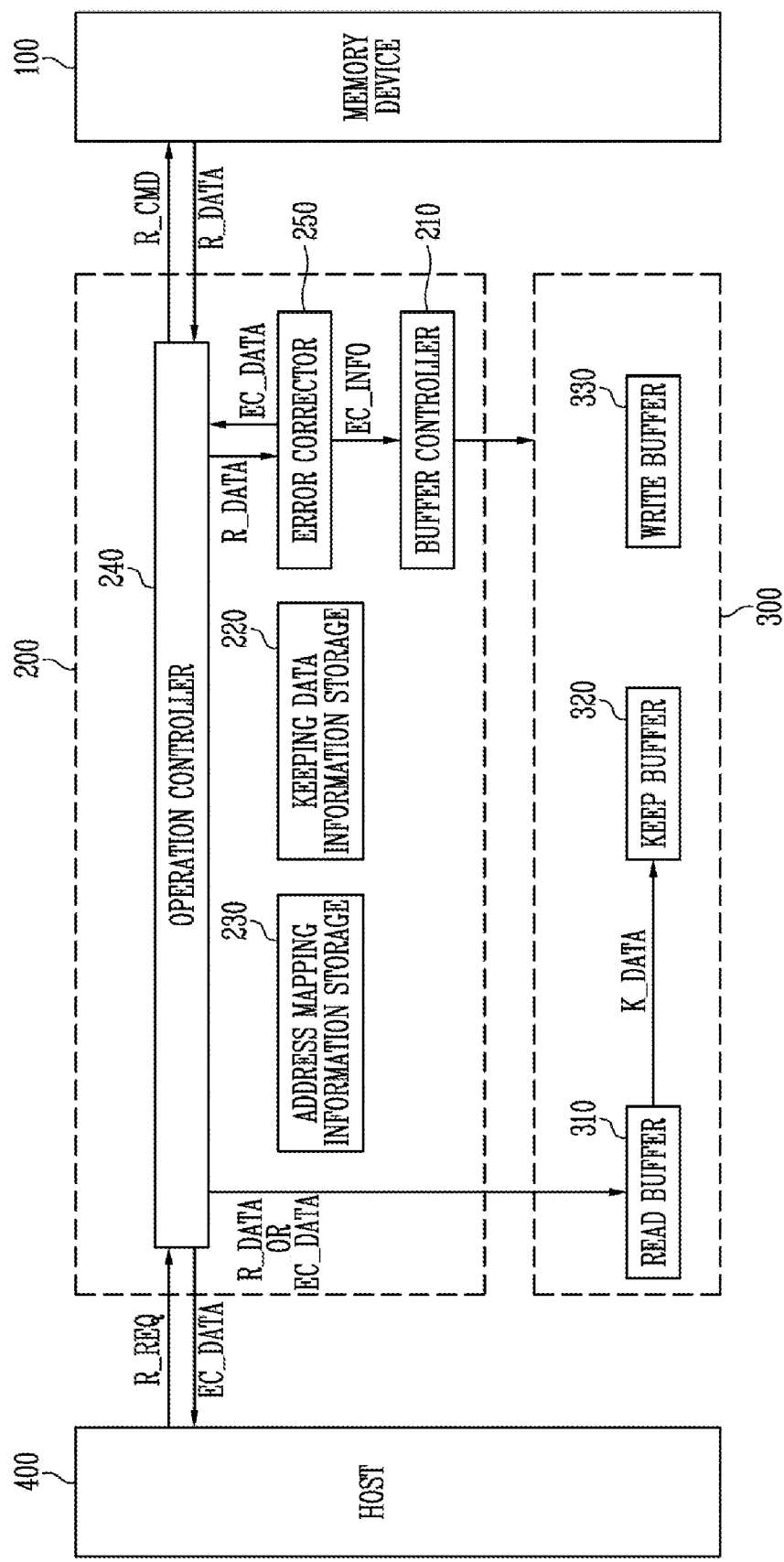
FIG. 2 illustrates an operation of storing keeping data in a keep buffer according to an embodiment of the present disclosure.

FIG. 2 illustrates an operation of storing keeping data in a keep buffer according to an embodiment of the present disclosure.

A memory device 100, a memory controller 200, and a buffer memory device 300, which are illustrated in FIG. 2, may represent the memory device 100, the memory controller 200, and the buffer memory device 300, respectively, which are illustrated in FIG. 1.

Referring to FIG. 2, an operation controller 240 may receive a read request R_REQ from a host 400. The operation controller 240 may generate a read command R_CMD specifying a read operation in response to the read request. The operation controller 240 may output the read command R_CMD to the memory device 100. The operation controller 240 may be provided with data R_DATA read from the memory device 100. Further, the operation controller 240 may provide the read data R_DATA to an error corrector 250. The error corrector 250 may detect error bits contained in the read data R_DATA, and may perform an error correction operation on the read data R_DATA. The error corrector 250 may provide error-corrected data EC_DATA, obtained through the error correction operation, to the operation controller 240. The operation controller 240 may provide the error-corrected data EC_DATA to the host 400.

In an embodiment, the operation controller 240 may provide the read data R_DATA to the read buffer 310, and a buffer controller 210 may control the buffer memory device 300 so that the read data R_DATA is stored in the read buffer 310. In this case, the buffer controller 210 may update buffer mapping information so as to store a read buffer address corresponding to the read data R_DATA. In an embodiment, the operation controller 240 may provide the error-corrected data EC_DATA to the read buffer 310, and the buffer controller 210 may control the buffer memory device 300 so that the error-corrected data EC_DATA is stored in the read buffer 310 and may update buffer mapping information so as to store a read buffer address corresponding to the error-corrected data EC_DATA. In an embodiment, data corresponding to the read data R_DATA is only stored in the read buffer 310 when the read data R_DATA has been successfully error-corrected by the error corrector 250.

The error corrector 250 may provide information about the number of error bits EC_INFO contained in the read data R_DATA to the buffer controller 210.

The buffer controller 210 may determine keeping data among pieces of data stored in the read buffer 310 based on the information about the number of error bits EC_INFO. For example, the buffer controller 210 may determine data among the pieces of data stored in the read buffer 310 that contained a number of error bits (before being corrected) greater than the preset first reference number of error bits to be keeping data K_DATA. The buffer controller 210 may control the buffer memory device 300 so that the keeping data K_DATA temporarily stored in the read buffer 310 is stored in the keep buffer 320. In this case, the buffer controller 210 may control the buffer memory device 300 so that a logical address K_LBA corresponding to the keeping data and information about a memory block from which the keeping data was read are stored, together with the keeping data K_DATA, in the keep buffer 320, and may provide information related to the keeping data (such as a number of error bits that were corrected, a timestamp, or a size of the keeping data) to the keeping data information storage 220. The buffer controller 210 may control the buffer memory device 300 so that the data temporarily stored in the read buffer 310 that has been stored in the keep buffer 320 is removed from the read buffer 310.

FIG. 3 illustrates buffer mapping information.

Referring to FIG. 3, the buffer mapping information may include read buffer mapping information and keep buffer mapping information.

In an embodiment, the read buffer mapping information may indicate a mapping relationship between a read buffer address and a buffer address. Here, the read buffer address may indicate the address of data stored in a read buffer 310. The buffer address may indicate the physical address of data stored in a buffer memory device 300.

For example, a 0-th read buffer address RB_ADDR 0 may be mapped to an A-th buffer address B_ADDR A. In this case, data stored at the A-th buffer address B_ADDR A may be data stored in the read buffer 310, and may have the 0-th read buffer address RB_ADDR 0. Further, a first read buffer address RB_ADDR 1 may be mapped to a B-th buffer address B_ADDR B. In this case, data stored at the B-th buffer address B_ADDR B may be data stored in the read buffer 310, and may have the first read buffer address RB_ADDR 1. Further, a second read buffer address RB_ADDR 2 may be mapped to a C-th buffer address B_ADDR C. In this case, data stored at the C-th buffer address B_ADDR C may be data stored in the read buffer 310, and may have the second read buffer address RB_ADDR 2. Furthermore, a third read buffer address RB_ADDR 3 may be mapped to a D-th buffer address B_ADDR D. In this case, data stored at the D-th buffer address B_ADDR D may be data stored in the read buffer 310, and may have the third read buffer address RB_ADDR 3.

In an embodiment, the keep buffer mapping information may indicate a mapping relationship between a keep buffer address and a buffer address. The keep buffer address may indicate the address of data stored in the keep buffer 320.

In an embodiment, when the keeping data is stored in the keep buffer 320, a keep buffer address corresponding to the keeping data may be stored in the buffer mapping information. The mapping relationship between the keep buffer address and the buffer address may be applied in the same manner as the above-described mapping relationship between the read buffer address and the buffer address.

Meanwhile, although not shown in the example illustrated in FIG. 3, the buffer mapping information may further include write buffer mapping information indicating a mapping relationship between a write buffer address and a buffer address. The write buffer address may indicate the address of data stored in the write buffer. The mapping relationship between the write buffer address and the buffer address may be applied in the same manner as the above-described mapping relationship between the read buffer address and the buffer address.

Figure 4:
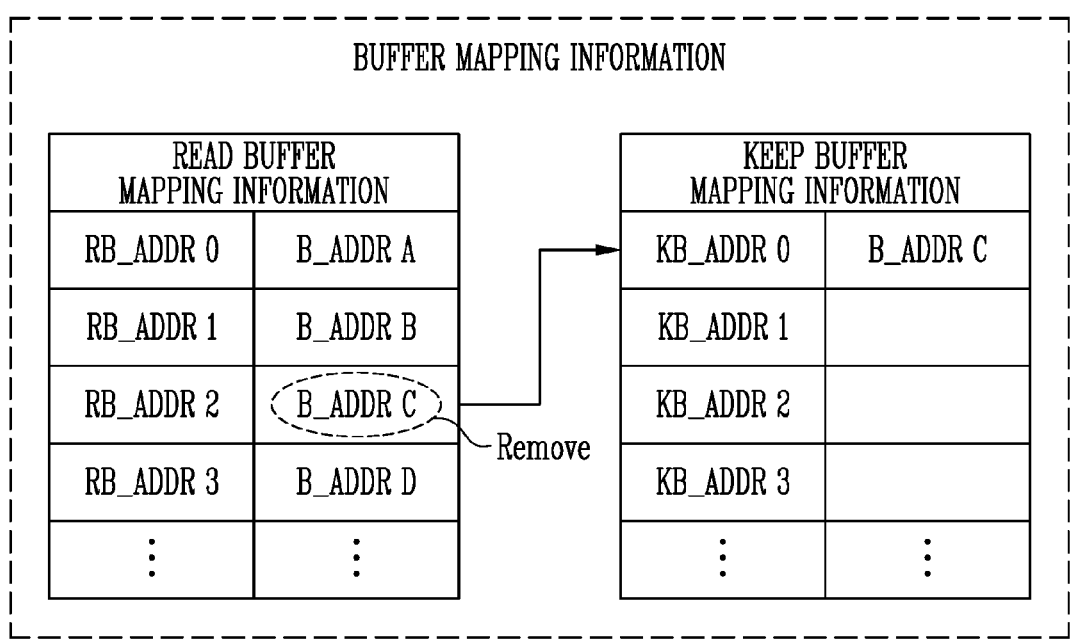
FIG. 4 illustrates an operation of updating buffer mapping information according to an embodiment of the present disclosure.

FIG. 4 illustrates an operation of updating buffer mapping information according to an embodiment of the present disclosure.

In the example of FIG. 4, initially a 0-th read buffer address RB_ADDR 0 is mapped to an A-th buffer address B_ADDR A, a first read buffer address RB_ADDR 1 is mapped to a B-th buffer address B_ADDR B, a second read buffer address RB_ADDR 2 is mapped to a C-th buffer address B_ADDR C, and a third read buffer address RB_ADDR 3 is mapped to a D-th buffer address B_ADDR D.

In an embodiment, when keeping data is stored in a keep buffer 320, a buffer controller 210 may transform a read buffer address corresponding to the keeping data into a keep buffer address corresponding to the keeping data. In the example, data stored at the C-th buffer address B_ADDR C is keeping data. In an embodiment, it is assumed that the keeping data is not initially stored in the keep buffer 320. Accordingly, the buffer controller 210 may transfer the second read buffer address RB_ADDR 2 corresponding to the keeping data into the 0-th keep buffer address KB_ADDR 0. Therefore, the buffer controller 210 may update the keep buffer mapping information so that the 0-th keep buffer address KB_ADDR 0 corresponding to the keeping data is mapped to the C-th buffer address B_ADDR C that the second read buffer address RB_ADDR 2 had been mapped to. Also, the buffer controller 210 may remove a mapping relationship between the second read buffer address RB_ADDR 2 and the C-th buffer address B_ADDR C, which is included in read buffer mapping information.

Therefore, in accordance with an embodiment of the present disclosure, the read buffer address corresponding to the keeping data is transformed into the keep buffer address without data movement, and thus the time required to store the keeping data in the keep buffer 320 may be shortened.

Figure 5:
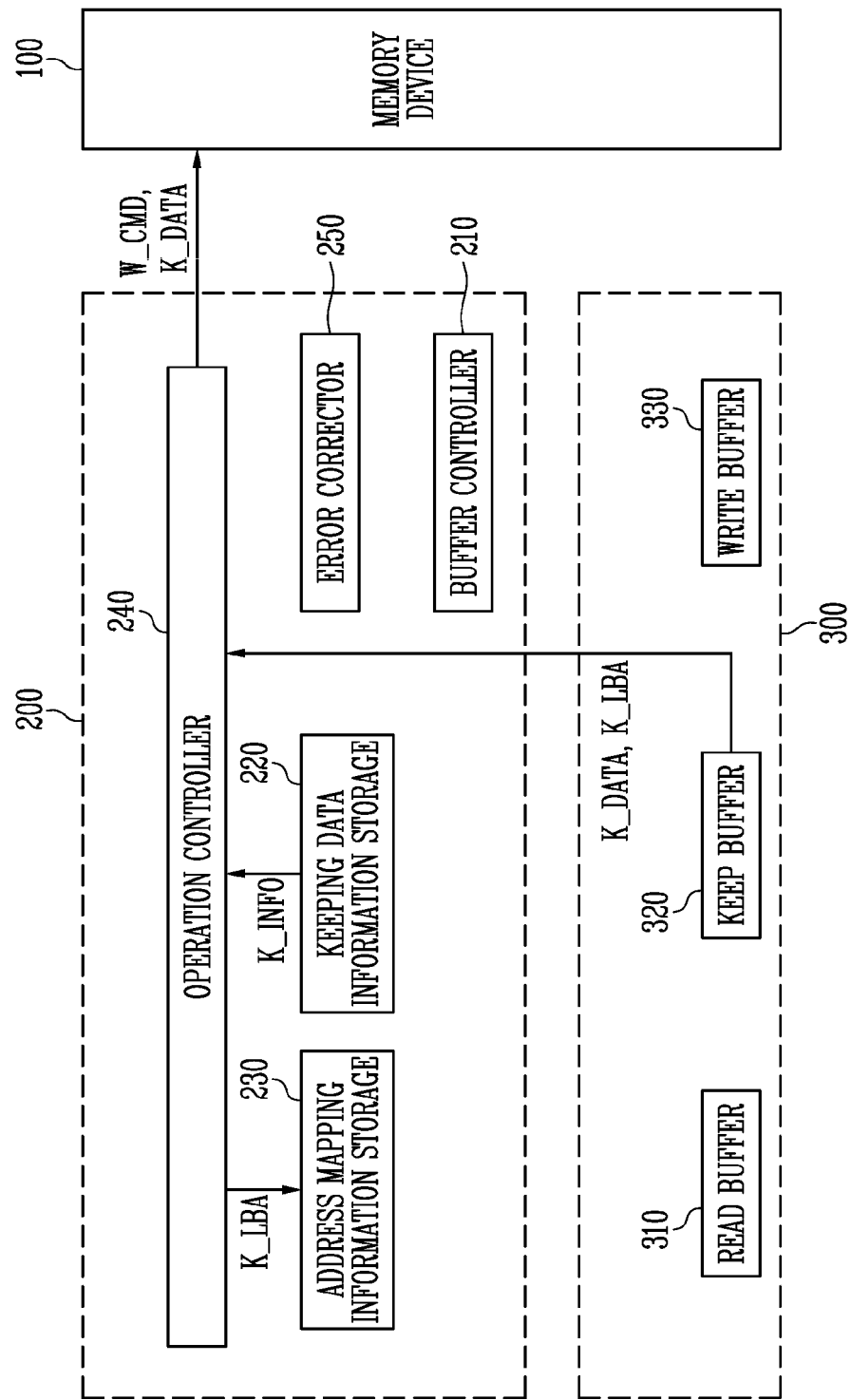
FIG. 5 illustrates an operation of storing keeping data, stored in a keep buffer, in a memory device according to an embodiment of the present disclosure.

FIG. 5 illustrates an operation of storing keeping data, stored in a keep buffer, in a memory device according to an embodiment of the present disclosure.

A memory device 100, a memory controller 200, and a buffer memory device 300, which are illustrated in FIG. 5, may represent the memory device 100, the memory controller 200, and the buffer memory device 300, respectively, which are illustrated in FIG. 1.

Referring to FIG. 5, a keeping data information storage 220 may provide information related to keeping data to an operation controller 240. Here, the information related to the keeping data may include information about a residual space of a keep buffer 320, information about the time elapsed since the storage of the keeping data in the keep buffer 320, information about the number of error bits contained in the read data corresponding to the keeping data before error correction, etc.

The operation controller 240 may be provided with keeping data K_DATA and a logical address K_LBA corresponding to the keeping data from the keep buffer 320. The operation controller 240 may determine whether the information related to the keeping data exceeds a preset threshold value. When the information related to the keeping data exceeds the preset threshold value, the operation controller 240 may generate a write command W_CMD instructing the keeping data K_DATA to be stored in any one of a plurality of memory blocks. The operation controller 240 may provide the write command W_CMD and the keeping data K_DATA to the memory device 100. The memory device 100 may store the keeping data K_DATA in any one memory block in response to the write command W_CMD.

In an embodiment, the information related to the keeping data may include a size of the keeping data stored in the keep buffer 320, and the operation controller 240 may determine whether the size of the keeping data stored in the keep buffer 320 is greater than a preset size. When it is determined that the size of the keeping data stored in the keep buffer 320 is greater than the preset size, the operation controller 240 may control the memory device 100 so that the keeping data K_DATA stored in the keep buffer 320 is stored in any one memory block.

In an embodiment, the information related to the keeping data may relate to a time elapsed since the storage of the keeping data K_DATA in the keep buffer 320, and the operation controller 240 may determine whether the time elapsed since the storage of the keeping data K DATA in the keep buffer 320 exceeds a preset time. Here, various embodiments may apply various techniques to determine whether the time elapsed since the storage of the keeping data K_DATA exceeds the preset time. For example, the operation controller 240 may determine whether the time elapsed from the time point at which an earliest pieces of the keeping data K_DATA was stored in the keep buffer 320 exceeds the preset time. In an example, the operation controller 240 may determine whether the time elapsed from the time point at which a most recent piece of the keeping data K DATA was stored in the keep buffer 320 exceeds a preset time. In an example, when the average of the times elapsed from the time points at which a plurality of pieces of keeping data K_DATA were stored in the keep buffer 320 exceeds a preset time, the operation controller 240 may control the memory device 100 so that the pieces of keeping data K_DATA are stored in any one memory block.

In an embodiment, the information related to the keeping data may relate to number of error bits corresponding to the keeping data K_DATA in the keep buffer 320 (such as a number of error bits in read data R_DATA corresponding to the keeping data K_DATA), and the operation controller 240 may determine whether the number of error bits corresponding to the keeping data K_DATA stored in the keep buffer 320 is greater than the preset second reference number of error bits. In an embodiment, when it is determined that the number of error bits corresponding to the keeping data K_DATA stored in the keep buffer 320 is greater than the preset second reference number of error bits, the operation controller 240 may control the memory device 100 so that the keeping data K_DATA stored in the keep buffer 320 is stored in any one memory block.

In an embodiment, the operation controller 240 may provide both a logical address K_LBA corresponding to the keeping data and a physical address corresponding to the one memory block into which the keeping data is to being stored to the address mapping information storage 230. The address mapping information storage 230 may update address mapping information so that the logical address K_LBA corresponding to the keeping data and the physical address corresponding to the one memory block are mapped to each other.

Figure 6:
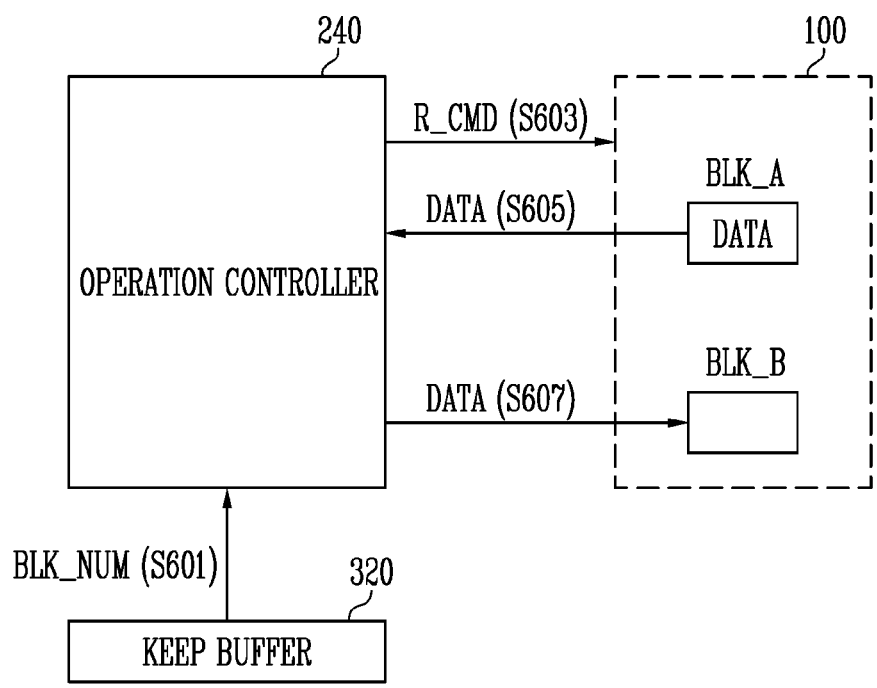
FIG. 6 illustrates an operation of storing data, stored in a memory block from which keeping data was read, in another memory block according to an embodiment of the present disclosure.

FIG. 6 illustrates an operation of storing data, stored in a memory block from which keeping data was read, in another memory block according to an embodiment of the present disclosure.

A memory device 100, an operation controller 240, and a keep buffer 320, which are illustrated in FIG. 6, may represent the memory device 100, the operation controller 240, and the keep buffer 320, respectively, which are illustrated in FIG. 1.

In the example of FIG. 6, keeping data corresponds to data read from a memory block BLK_A. That is, it is assumed that, after data read from the memory block BLK_A is stored in a read buffer (in embodiments, after being error-corrected), keeping data of the data stored in the read buffer is stored in the keep buffer.

Referring to FIG. 6, at step S601, the operation controller 240 may be provided with information BLK_NUM about the memory block from which data that produced the keeping data was read. In an embodiment, the information BLK_NUM about the memory block from which the data that produced the keeping data was read may be information about the location of the memory block from which the data that produced the keeping data was read. For example, the information BLK_NUM about the memory block may indicate a number allocated to the corresponding memory block.

At step S603, the operation controller 240 may output a read command R_CMD to the memory device 100. For example, the operation controller 240 may generate a read command R_CMD instructing a test read operation to be performed on the memory block BLK_A from which the keeping data is read, based on the information BLK_NUM about the memory block. The operation controller 240 may output the generated read command R_CMD to the memory device 100.

At step S605, the operation controller 240 may be provided with data DATA stored in the memory block BLK_A from the memory device 100. For example, the memory device 100 may read the data DATA stored in the memory block BLK_A in response to the read command R_CMD. The memory device 100 may provide the read data DATA to the operation controller 240. The operation controller 240 may determine whether the data DATA contains a number of error bits greater than the preset third reference number of error bits.

When it is determined that the data DATA contains a number of error bits greater than the preset third reference number of error bits, the operation controller 240 may control the memory device 100 so that the data DATA stored in the memory block BLK_A from which the keeping data was read is stored in a memory block BLK_B different from the memory block from which the keeping data is read, among the plurality of memory blocks, at step S607. For example, the operation controller 240 may provide a write command, together with the data DATA, to the memory device 100. In embodiment, the data DATA is error-corrected and the error-corrected data is provided with the write command. The memory device 100 may store the data provided with the write command in another memory block BLK_B in response to the write command.

Figure 7:
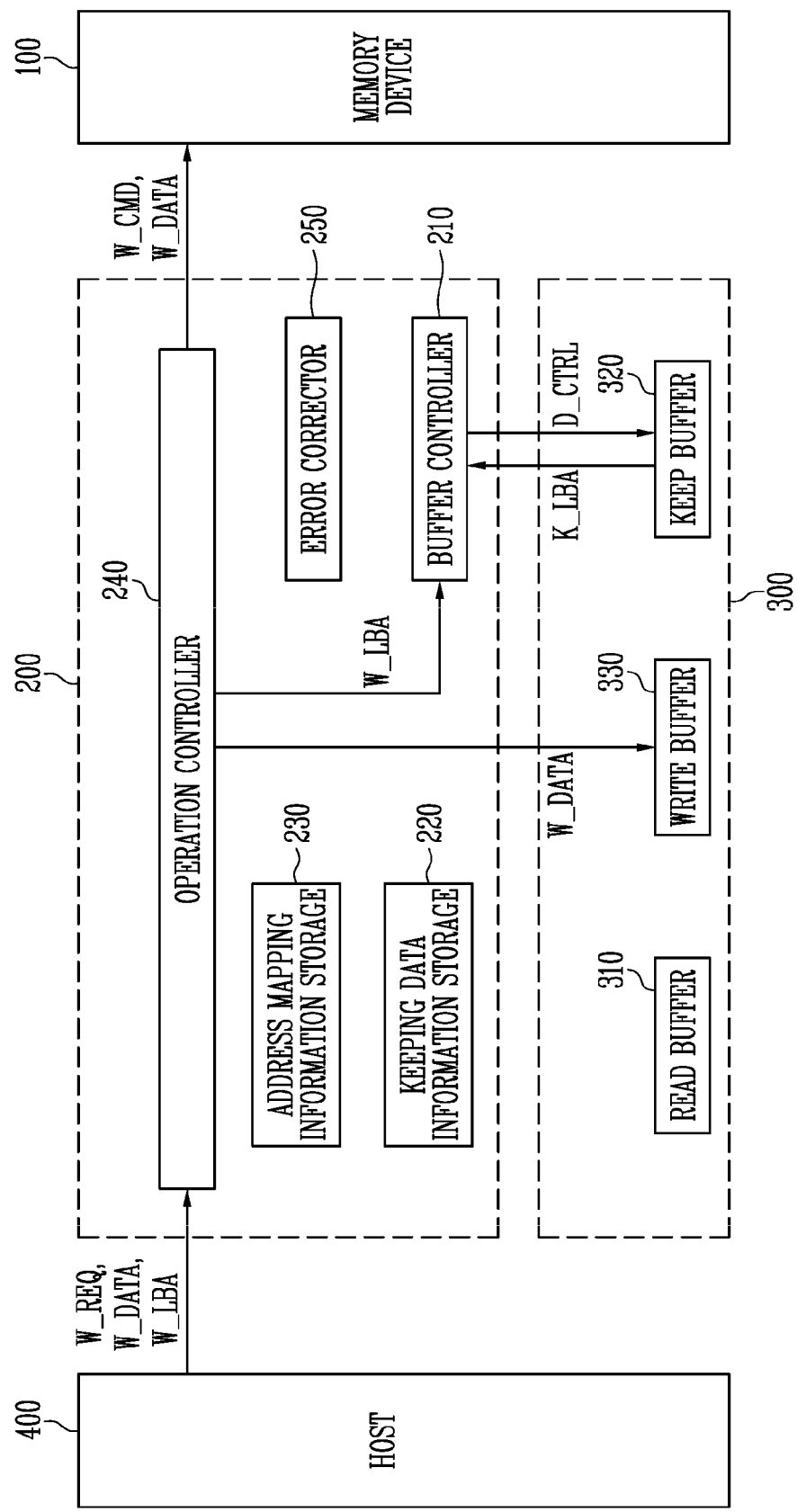
FIG. 7 illustrates an operation of removing keeping data, having the same logical address as data requested by a host to be written, from a keep buffer according to an embodiment of the present disclosure.

FIG. 7 illustrates an operation of removing keeping data having the same logical address as data requested to be written by a host from a keep buffer according to an embodiment of the present disclosure.

A memory device 100, a memory controller 200, and a buffer memory device 300, which are illustrated in FIG. 7, may represent the memory device 100, the memory controller 200, and the buffer memory device 300, respectively, which are illustrated in FIG. 1.

Referring to FIG. 7, a host 400 may provide data requested to be written W_DATA and a logical address W_LBA corresponding to the data requested to be written W_DATA together with a write request W_REQ to the operation controller 240.

The operation controller 240 may receive the write request W_REQ from the host 400, and may provide the data requested to be written W_DATA to the write buffer 330. The operation controller 240 may provide the logical address W_LBA corresponding to the data requested to be written W_DATA to the buffer controller 210. The operation controller 240 may generate a write command W_CMD indicating that a write operation is to be performed using the data requested to be written W_DATA. The operation controller 240 may provide both the write command W_CMD and the data requested to be written W_DATA to the memory device 100. The memory device 100 may store the data requested to be written W_DATA in response to the write command W_CMD.

The buffer controller 210 may be provided with a logical address K_LBA corresponding to the keeping data from the keep buffer 320. The buffer controller 210 may determine whether the logical address W_LBA corresponding to the data requested to be written and the logical address K_LBA corresponding to the keeping data are the same logical address. When it is determined that the logical address W_LBA corresponding to the data requested to be written and the logical address K_LBA corresponding to the keeping data are the same logical address, the buffer controller 210 may output a control signal D_CTRL to the keep buffer 320 so as to remove, from the keep buffer 320, the keeping data having the same logical address as the logical address W_LBA corresponding to the data requested to be written. Removing the keeping data having the same logical address as the logical address W_LBA from the keep buffer 320 may include removing, from keep buffer mapping information, a mapping relationship between a keep buffer address corresponding to the keeping data and a buffer address.

Figure 8:
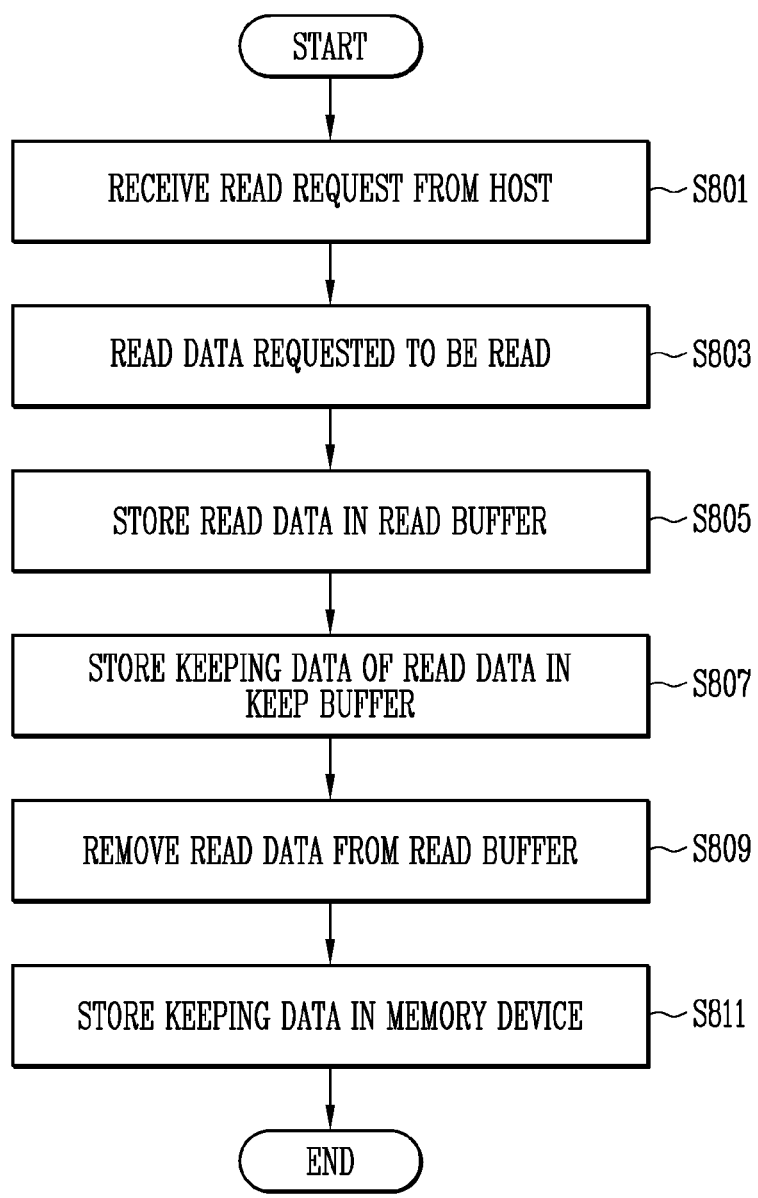
FIG. 8 is a flowchart illustrating a process for operating a memory system according to an embodiment of the present disclosure.

FIG. 8 is a flowchart illustrating a process for operating a memory system according to an embodiment of the present disclosure.

The process illustrated in FIG. 8 may be performed by, for example, the memory system 50 illustrated in FIG. 1.

Referring to FIG. 8, at step S801, the memory system 50 receive a read request from the host 400.

At step S803, the memory system 50 may read data requested to be read by the read request from the host 400. For example, the operation controller 240 may output a read command to the memory device 100, and may be provided with the data requested to be read from the memory device 100.

At step S805, the memory system 50 may store the read data in the read buffer 310. For example, the buffer controller 210 may control the buffer memory device 300 so that the read data is temporarily stored in the read buffer 310. In an embodiment, the read data is stored in the read buffer after having been error-corrected.

At step S807, the memory system 50 may store keeping data included in the read data in the keep buffer 320. For example, the buffer controller 210 may control the buffer memory device 300 so that keeping data K_DATA, included in the data temporarily stored in the read buffer 310, is stored in the keep buffer 320.

At step S809, the memory system 50 may remove the read data from the read buffer 310.

At step S811, the memory system 50 may store the keeping data in the memory device 100. In an example, the operation controller 240 may control the memory device 100 so that the keeping data stored in the keep buffer 320 is stored in any one of the plurality of memory blocks.

Figure 9:
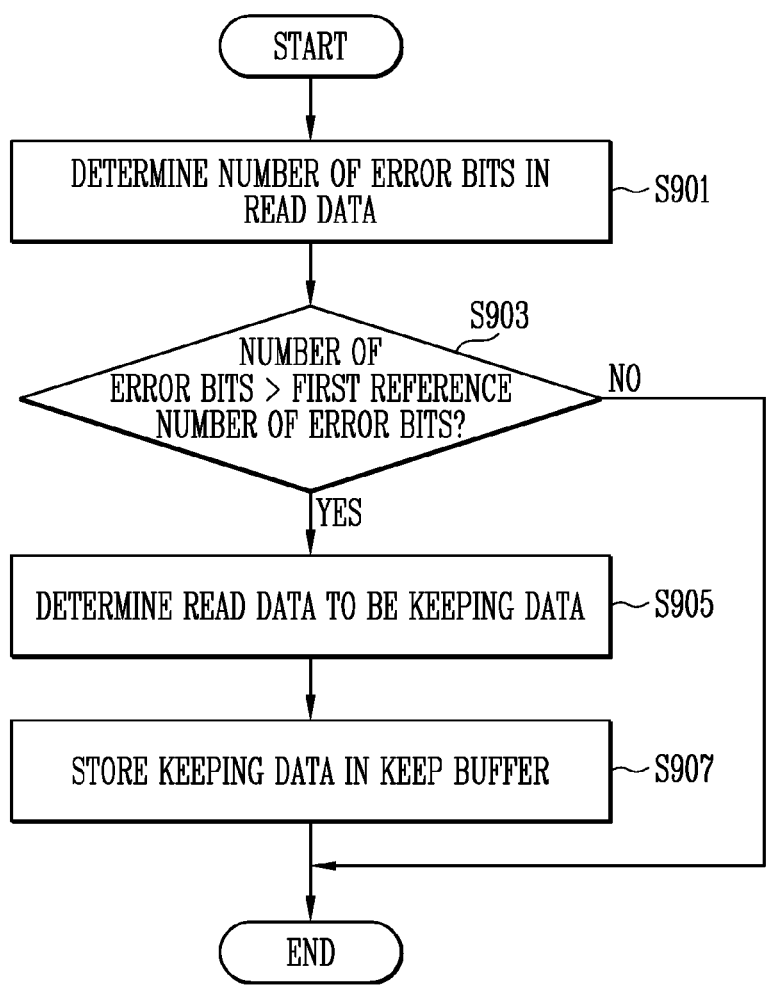
FIG. 9 is a flowchart illustrating a process for storing keeping data in a keep buffer according to an embodiment of the present disclosure.

FIG. 9 is a flowchart illustrating a process for storing keeping data in a keep buffer according to an embodiment of the present disclosure.

In an embodiment, the process illustrated in FIG. 9 may be a detailed embodiment of, for example, step S807 illustrated in FIG. 8.

The process illustrated in FIG. 9 may be performed by, for example, the memory system 50 illustrated in FIG. 1.

Referring to FIG. 9, at step S901, the memory system 50 may determine the number of error bits in data read from the memory device 100.

At step S903, the memory system 50 may determine whether the number of error bits in the read data is greater than the preset first reference number of error bits. For example, when it is determined that the number of error bits in the read data is greater than the preset first reference number of error bits, the operation controller 240 may perform step S905. In contrast, when it is determined that the number of error bits in the read data is not greater than the preset first reference number of error bits, the process of FIG. 9 may be terminated.

At step S905, the memory system 50 may determine the read data to be keeping data.

At step S907, the memory system 50 may store the keeping data in the keep buffer 320. In embodiments, the keeping data may be error-corrected before being stored in the keep buffer 320.

Figure 10:
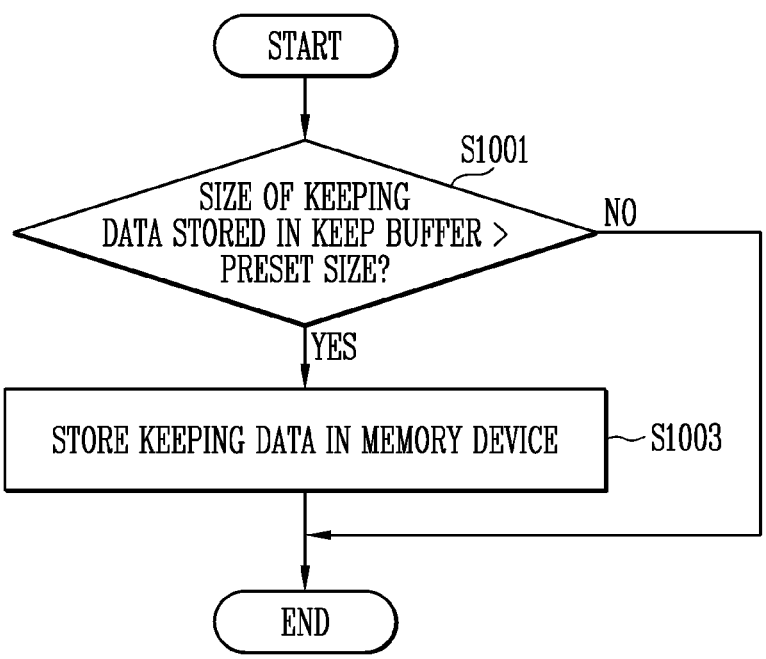
FIG. 10 is a flowchart illustrating a process for storing keeping data in a memory device according to an embodiment of the present disclosure.

FIG. 10 is a flowchart illustrating a process for storing keeping data in a memory device according to an embodiment of the present disclosure.

In an embodiment, the process illustrated in FIG. 10 may be a detailed embodiment included in, for example, step S811 illustrated in FIG. 8.

The process illustrated in FIG. 10 may be performed by, for example, the memory system 50 illustrated in FIG. 1.

Referring to FIG. 10, at step S1001, the memory system 50 may determine whether the size of keeping data stored in the keep buffer 320 is greater than a preset size. When it is determined that the size of the keeping data stored in the keep buffer 320 is greater than the preset size, step S1003 may be performed. In contrast, when it is determined that the size of the keeping data stored in the keep buffer 320 is not greater than the preset size, the process of FIG. 10 may be terminated.

At step S1003, the memory system 50 may store the keeping data in the memory device 100.

Figure 11:
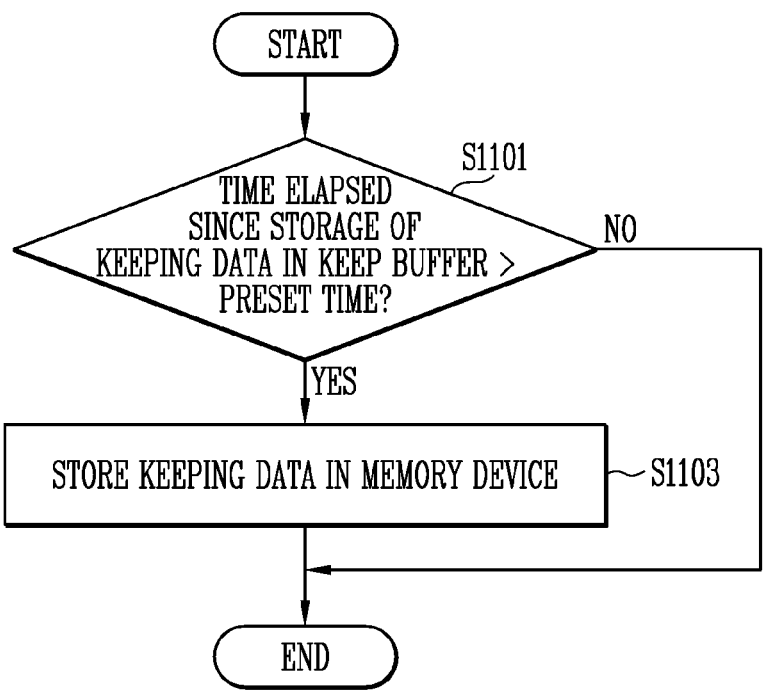
FIG. 11 is a flowchart illustrating an example of a process for storing keeping data in a memory device according to an embodiment of the present disclosure.

FIG. 11 is a flowchart illustrating an example of the process for storing keeping data in the memory device according to an embodiment of the present disclosure.

In an embodiment, the process illustrated in FIG. 11 may be a detailed embodiment included in, for example, step S811 illustrated in FIG. 8.

The process illustrated in FIG. 11 may be performed by, for example, the memory system 50 illustrated in FIG. 1.

Referring to FIG. 11, at step S1101, the memory system 50 may determine whether the time elapsed since the storage of the keeping data in the keep buffer 320 exceeds a preset time. For example, when it is determined that the time elapsed since the storage of the keeping data in the keep buffer 320 exceeds the preset time, step S1103 may be performed. In an embodiment, the time elapsed since the storage of the keeping data in the keep buffer 320 may be based on the time elapsed since the storing of a least recent piece of the keeping data stored in the keep buffer 320. In an embodiment, the time elapsed since the storage of the keeping data in the keep buffer 320 may be based on the time elapsed since the storing of a most recent piece of the keeping data stored in the keep buffer 320. In an embodiment, the time elapsed since the storage of the keeping data in the keep buffer 320 may be based on the average of the respective times elapsed since the storing of the pieces of keeping data in the keep buffer 320. In an embodiment, the time elapsed since the storage of the keeping data in the keep buffer 320 and the preset time may vary in respective embodiments.

In contrast, when it is determined that the time elapsed since the storage of the keeping data in the keep buffer 320 does not exceed the preset time, the process of FIG. 11 may be terminated.

At step S1103, the memory system 50 may store the keeping data in the memory device 100.

Figure 12:
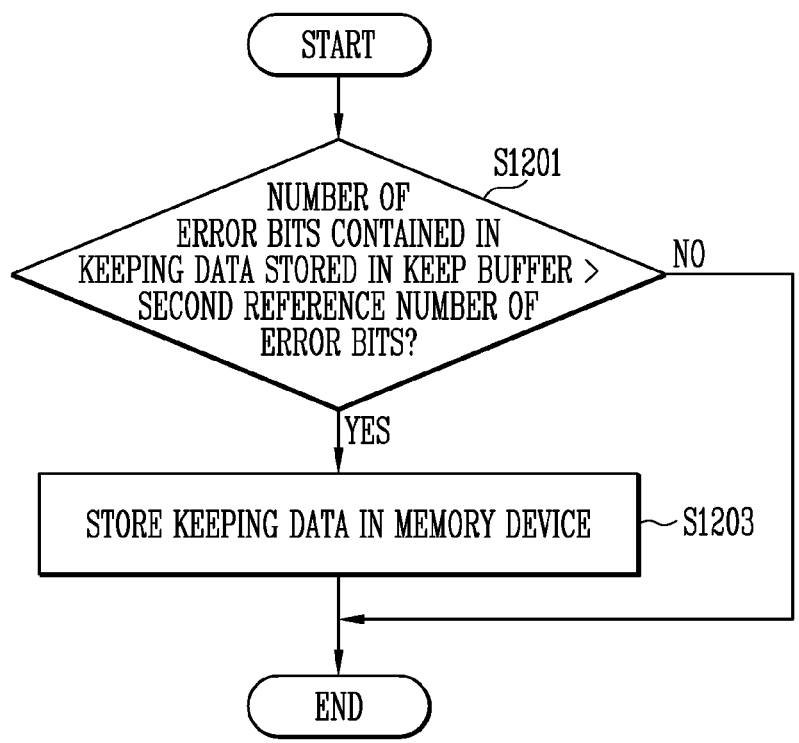
FIG. 12 is a flowchart illustrating an example of a process for storing keeping data in a memory device according to an embodiment of the present disclosure.

FIG. 12 is a flowchart illustrating an example of the process for storing keeping data in the memory device according to an embodiment of the present disclosure.

In an embodiment, the process illustrated in FIG. 12 may be a detailed embodiment included in, for example, step S811 illustrated in FIG. 8.

The process illustrated in FIG. 12 may be performed by, for example, the memory system 50 illustrated in FIG. 1.

Referring to FIG. 12, at step S1201, the memory system 50 may determine whether the number of error bits corresponding to the keeping data stored in the keep buffer 320 is greater than the preset second reference number of error bits. For example, when it is determined that the number of error bits corresponding to the keeping data stored in the keep buffer 320 is greater than the preset second reference number of error bits, step S1203 may be performed. In contrast, when it is determined that the number of error bits corresponding to the keeping data stored in the keep buffer 320 is not greater than the preset second reference number of error bits, the process of FIG. 12 may be terminated.

At step S1203, the memory system 50 may store the keeping data in the memory device 100.

Figure 13:
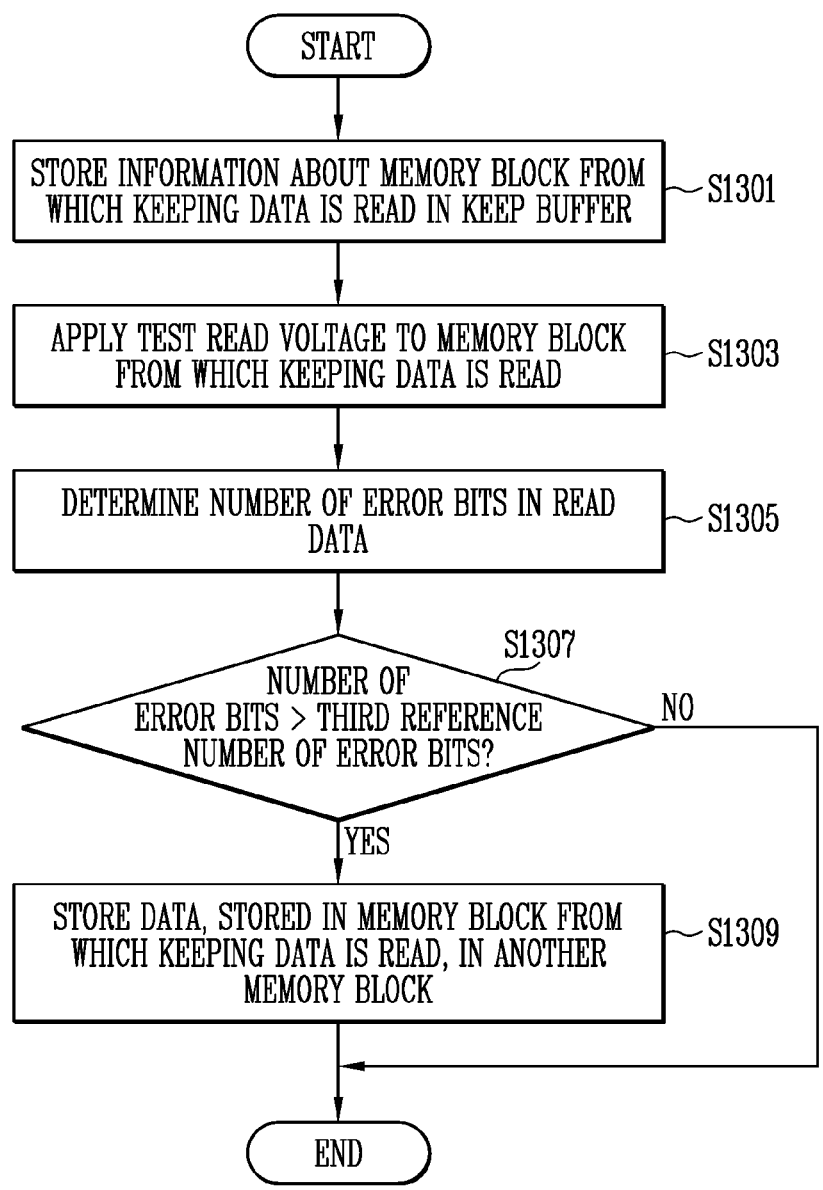
FIG. 13 is a flowchart illustrating a process for storing data, stored in a memory block from which keeping data was read, in another memory block according to an embodiment of the present disclosure.

FIG. 13 is a flowchart illustrating a process for storing data stored in a memory block from which keeping data is read in another memory block according to an embodiment of the present disclosure.

The process illustrated in FIG. 13 may be performed by, for example, the memory system 50 illustrated in FIG. 1.

Referring to FIG. 13, at step S1301, the memory system 50 may store information about a memory block from which keeping data was read in the keep buffer 320. For example, when the keeping data is stored in the keep buffer 320, the keep buffer 320 may store information about a location corresponding to the memory block from which the keeping data was read among a plurality of memory blocks. For example, the information about the memory block may indicate a number allocated to the corresponding memory block.

At step S1303, the memory system 50 may apply a test read voltage to the memory block from which the keeping data is read. For example, the memory system 50 may read data from the memory block to which the test read voltage is applied. For example, the test read voltage is a voltage used to determine the number of error bits for the memory blocks from which the keeping data was read.

At step S1305, the memory system 50 may determine the number of error bits in data read from the memory block by applying the test read voltage to the memory block.

At step S1307, the memory system 50 may determine whether the number of error bits in the read data is greater than the preset third reference number of error bits. For example, when it is determined that the number of error bits in the read data is greater than the preset third reference number of error bits, step S1309 may be performed. In contrast, when the number of error bits in the read data is not greater than the preset third reference number of error bits, the process of FIG. 13 may be terminated.

At step S1309, the memory system 50 may store the data stored in the memory block from which the keeping data was read in another memory block. In an embodiment, the data stored in the memory block may be error-corrected data. In an embodiment, the data stored in the other memory block is the keeping data previously stored in the keep buffer 320.

Figure 14:
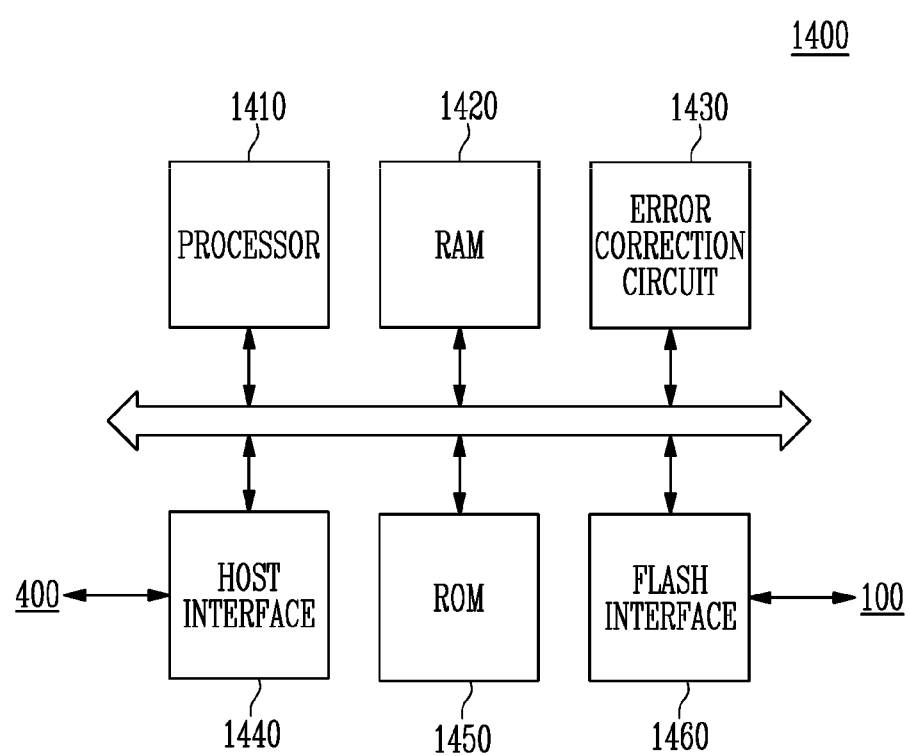
FIG. 14 illustrates a memory controller according to an embodiment of the present disclosure.

FIG. 14 illustrates a memory controller according to an embodiment of the present disclosure.

For example, the memory controller 1400 of FIG. 14 may be implemented as a device including the memory controller 200 and the buffer memory device 300 of FIG. 1.

Referring to FIG. 14, the memory controller 1400 may include a processor 1410, a RAM 1420, an error correction circuit 1430, a host interface 1440, a ROM 1450, and a flash interface 1460.

The processor 1410 may control the overall operation of the memory controller 1400. The buffer controller 210 and the operation controller 240 illustrated in FIG. 1 may be implemented as one component of the processor 1410 of FIG. 14.

The RAM 1420 may be used as a buffer memory, a cache memory or a working memory of the memory controller 1400. The buffer memory device 300 illustrated in FIG. 1 may be implemented as one component of the RAM 1420 of FIG. 14.

In an embodiment, the RAM 1420 may include a read buffer area in which data read from the memory device 100 is stored, a keep buffer area in which keeping data is stored, and a write buffer area in which data requested by a host 400 to be written is stored. Here, the read buffer area may correspond to the read buffer 310 of FIG. 1, the keep buffer area may correspond to the keep buffer 320 of FIG. 1, and the write buffer area may correspond to the write buffer 330 of FIG. 1.

In an embodiment, the processor 1410 may control the RAM 1420 to store data read from the memory device 100. The RAM 1420 may store the read data in the read buffer area under the control of the processor 1410. Also, in an embodiment, the processor 1410 may control the RAM 1420 so that, of the data stored in the read buffer area, keeping data is stored in the keep buffer area. The RAM 1420 may store the keeping data in the keep buffer area and remove the data stored in the read buffer area, under the control of the processor 1410.

Further, the keeping data information storage 220 and the address mapping information storage 230 of FIG. 1 may be implemented as one component of the RAM 1420 of FIG. 14. For example, the RAM 1420 may store information related to the keeping data and the address mapping information.

In an embodiment, the processor 1410 may perform a function of a flash translation layer. The processor 1410 may translate a logical block address provided by the host 400 into a physical block address through a flash translation layer (FTL). The flash translation layer may receive the logical block address and translate the logical block address into the physical block address using the address mapping information stored in the RAM 1420. Examples of an address mapping process performed through the FTL may include various processes according to a mapping unit. Representative address mapping processes include a page mapping process, a block mapping process, and a hybrid mapping process. Further, when new data is stored in the memory device 100 or when the data stored in the memory device 100 is stored again at another location, the processor 1410 may control the RAM 1420 to update the address mapping information.

The error correction circuit 1430 may perform error correction. The error correction circuit 1430 may perform Error Correction Code (ECC) encoding based on data to be written to the memory device 100 through the flash interface 1460. The ECC-encoded data may be transferred to the memory device 100 through the flash interface 1460. The error correction circuit 1430 may perform error correction code decoding (ECC decoding) on data received from the memory device 100 through the flash interface 1460. In an example, the error corrector 250 illustrated in FIG. 1 may be implemented as one component of the error correction circuit 1430 of FIG. 14.

In an embodiment, the error correction circuit 1430 may detect error bits contained in the data read from the memory device 100.

The error correction circuit 1430 may provide information about the number of error bits contained in the read data to the processor 1410. In an embodiment, the error correction circuit 1430 may be included, as a component of the flash interface 1460, in the flash interface 1460.

The ROM 1450 may store various types of information required for the operation of the memory controller 1400 in the form of firmware.

The memory controller 1400 may communicate with an external device (e.g., the host 400, an application processor or the like) through the host interface 1440.

The memory controller 1400 may communicate with the memory device 100 through the flash interface 1460. The memory controller 1400 may transmit a command, an address, a control signal, etc. to the memory device 100 and receive data from the memory device 100, through the flash interface 1460. In an example, the flash interface 1460 may include a NAND interface.

In an embodiment, the processor 1410 may determine, based on the information related to the keeping data stored in the RAM 1420, whether the keeping data is to be stored in the memory device 100. When the information related to the keeping data exceeds a preset threshold, the processor 1410 may transmit the command, the address, the control signal, etc. for controlling the keeping data to be stored in any one of a plurality of memory blocks to the memory device 100 through the flash interface 1460.

Figure 15:
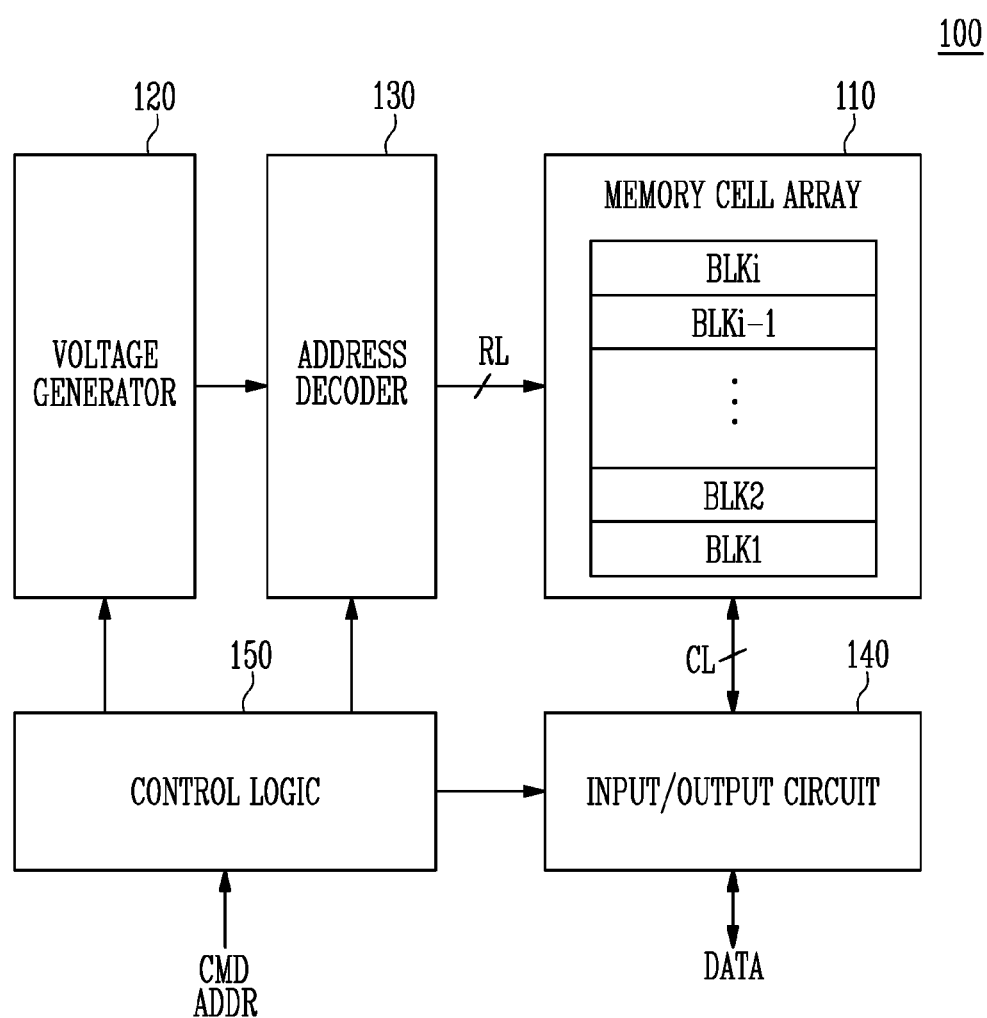
FIG. 15 illustrates a memory device of FIG. 1.

FIG. 15 illustrates the memory device 100 of FIG. 1.

Referring to FIG. 15, the memory device 100 may include a memory cell array 110, a voltage generator 120, an address decoder 130, an input/output (I/O) circuit 140, and a control logic 150.

The memory cell array 110 includes a plurality of memory blocks BLK1 to BLKi. The plurality of memory blocks BLK1 to BLKi may be coupled to the address decoder 130 through row lines RL. The plurality of memory blocks BLK1 to BLKi may be coupled to the input/output circuit 140 through column lines CL. In an embodiment, the row lines RL may include word lines, source select lines, and drain select lines. In an embodiment, the column lines CL may include bit lines.

Each of the memory blocks BLK1 to BLKi includes a plurality of memory cells. In an embodiment, the plurality of memory cells may be nonvolatile memory cells. Memory cells coupled to the same word line, among the plurality of memory cells, may be defined as one physical page. That is, the memory cell array 110 may include a plurality of physical pages. Each of the memory cells of the memory device 100 may be implemented as a single-level cell (SLC) capable of storing one data bit, a multi-level cell (MLC) capable of storing two data bits, a triple-level cell (TLC) capable of storing three data bits, or a quad-level cell (QLC) capable of storing four data bits.

Some of the plurality of memory blocks BLK1 to BLKi may be map data blocks which store map data, described above with reference to FIG. 1. The remaining memory blocks may be normal blocks which store data requested by the host 400.

In an embodiment, the voltage generator 120, the address decoder 130, and the input/output circuit 140 may be collectively designated as a peripheral circuit. The peripheral circuit may drive the memory cell array 110 under the control of the control logic 150. The peripheral circuit may drive the memory cell array 110 so as to perform a program operation, a read operation, and an erase operation.

The voltage generator 120 may generate a plurality of operating voltages Vop using an external supply voltage that is supplied to the memory device 100. The voltage generator 120 may be operated under the control of the control logic 150.

In an embodiment, the voltage generator 120 may generate an internal supply voltage by regulating the external supply voltage. The internal supply voltage generated by the voltage generator 120 may be used as an operating voltage for the memory device 100.

In an embodiment, the voltage generator 120 may generate the plurality of operating voltages using the external supply voltage or the internal supply voltage. The voltage generator 120 may generate various voltages required by the memory device 100. For example, the voltage generator 120 may generate a plurality of erase voltages, a plurality of program voltages, a plurality of pass voltages, a plurality of select read voltages, and a plurality of unselect read voltages.

The voltage generator 120 may include a plurality of pumping capacitors for receiving the internal supply voltage so as to generate a plurality of operating voltages having various voltage levels, and may generate the plurality of operating voltages by selectively enabling the plurality of pumping capacitors under the control of the control logic 150.

The generated operating voltages may be supplied to the memory cell array 110 by the address decoder 130.

The address decoder 130 is coupled to the memory cell array 110 through the row lines RL. The address decoder 130 may be operated under the control of the control logic 150. The address decoder 130 receives addresses ADDR from the control logic 150. The address decoder 130 may decode a block address, among the received addresses ADDR.

The address decoder 130 may select at least one of the memory blocks BLK1 to BLKi according to the decoded block address. The address decoder 130 may decode a row address, among the received addresses ADDR. The address decoder 130 may select at least one of word lines of the selected memory block according to the decoded row address. In an embodiment, the address decoder 130 may decode a column address, among the received addresses ADDR. The address decoder 130 may couple the input/output circuit 140 to the memory cell array 110 according to the decoded column address.

In accordance with the embodiment of the present disclosure, the address decoder 130 may apply a read voltage to a selected word line and apply a read pass voltage having a level higher than that of the read voltage to unselected word lines, during a read operation.

In an embodiment, the address decoder 130 may include components such as a row decoder, a column decoder, and an address buffer.

The input/output (I/O) circuit 140 may include a plurality of page buffers. The plurality of page buffers may be coupled to the memory cell array 110 through the bit lines. During a program operation, data may be stored in selected memory cells based on the data stored in the plurality of page buffers.

During a read operation, the data stored in the selected memory cells may be sensed through bit lines, and the sensed data may be stored in the page buffers.

The control logic 150 may control the address decoder 130, the voltage generator 120, and the input/output circuit 140. The control logic 150 may be operated in response to a command CMD transferred from an external device. The control circuit 150 may control the peripheral circuit by generating various types of signals in response to the command CMD and the addresses ADDR.

Figure 16:
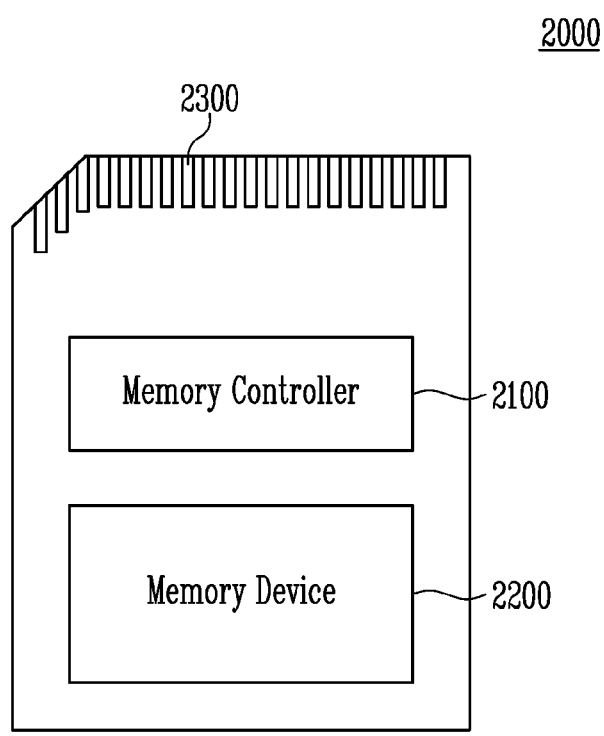
FIG. 16 is a block diagram illustrating a memory card system to which a memory system according to an embodiment of the present disclosure is applied.

FIG. 16 is a block diagram illustrating a memory card system to which a memory system according to an embodiment of the present disclosure is applied.

Referring to FIG. 16, a memory card system 2000 may include a memory controller 2100, a memory device 2200, and a connector 2300.

The memory controller 2100 is coupled to the memory device 2200. The memory controller 2100 may access the memory device 2200. For example, the memory controller 2100 may control read, write, erase, and background operations of the memory device 2200. The memory controller 2100 may provide an interface between the memory device 2200 and a host. The memory controller 2100 may run firmware for controlling the memory device 2200. The memory controller 2100 may be implemented in the same manner as the memory controller 200, described above with reference to FIG. 1. The memory device 2200 may be implemented in the same manner as the memory device 100, described above with reference to FIG. 1.

In an embodiment, the memory controller 2100 may include components, such as a RAM, a processor, a host interface, a memory interface, and an ECC circuit.

The memory controller 2100 may communicate with an external device through the connector 2300. The memory controller 2100 may communicate with an external device (e.g., a host) based on a specific communication protocol. In an embodiment, the memory controller 2100 may communicate with the external device through at least one of various communication protocols such as universal serial bus (USB), multimedia card (MMC), embedded MMC (eMMC), peripheral component interconnection (PCI), PCI-express (PCI-E), advanced technology attachment (ATA), serial-ATA (SATA), parallel-ATA (PATA), small computer system interface (SCSI), enhanced small disk interface (ESDI), integrated drive electronics (IDE), Firewire, universal flash storage (UFS), Wi-Fi, Bluetooth, and nonvolatile memory express (NVMe) protocols. In an embodiment, the connector 2300 may be defined by at least one of the above-described various communication protocols.

In an embodiment, the memory device 2200 may be implemented as any of various nonvolatile memory devices, such as an Electrically Erasable and Programmable ROM (EEPROM), a NAND flash memory, a NOR flash memory, a Phase-change RAM (PRAM), a Resistive RAM (Re-RAM), a Ferroelectric RAM (FRAM), a Spin Transfer Torque magnetic RAM (STT-MRAM).

The memory controller 2100 and the memory device 2200 may be integrated into a single semiconductor device to configure a memory card. For example, the memory controller 2100 and the memory device 2200 may be integrated into a single semiconductor device to configure a memory card such as a PC card (personal computer memory card international association: PCMCIA), a compact flash card (CF) card, a smart media card (SM or SMC), a memory stick, a multimedia card (MMC, RS-MMC, MMCmicro or eMMC), a SD card (SD, miniSD, microSD, or SDHC), or a universal flash storage (UFS).

Figure 17:
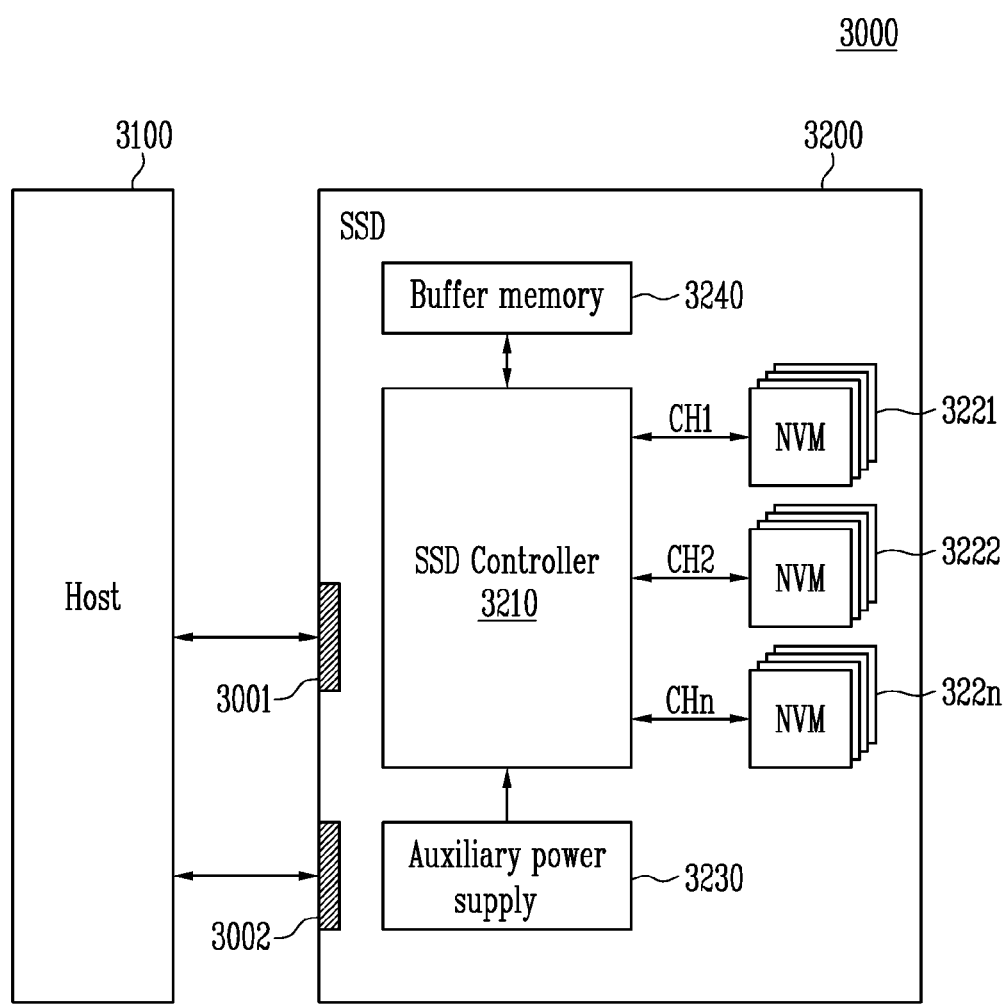
FIG. 17 is a block diagram illustrating a solid state drive (SSD) system to which a memory system according to an embodiment of the present disclosure is applied.

FIG. 17 is a block diagram illustrating a solid state drive (SSD) system to which a memory system according to an embodiment of the present disclosure is applied.

Referring to FIG. 17, an SSD system 3000 may include a host 3100 and an SSD 3200. The SSD 3200 may exchange signals with the host 3100 through a signal connector 3001 and may receive power through a power connector 3002. The SSD 3200 may include an SSD controller 3210, a plurality of flash memories 3221 to 322*n*, an auxiliary power supply 3230, and a buffer memory 3240.

In accordance with an embodiment of the present disclosure, the SSD controller 3210 may perform the function of the memory controller 200 described above with reference to FIG. 1.

The SSD controller 3210 may control the plurality of flash memories 3221 to 322*n* in response to the signals received from the host 3100. In an embodiment, the signals may be signals based on the interfaces of the host 3100 and the SSD 3200. For example, the signals may be signals defined by at least one of various interfaces such as universal serial bus (USB), multimedia card (MMC), embedded MMC (eMMC), peripheral component interconnection (PCI), PCI-express (PCI-E), advanced technology attachment (ATA), serial-ATA (SATA), parallel-ATA (PATA), small computer system interface (SCSI), enhanced small disk interface (ESDI), integrated drive electronics (IDE), Firewire, universal flash storage (UFS), Wi-Fi, Bluetooth, and nonvolatile memory express (NVMe) interfaces.

The auxiliary power supply 3230 may be coupled to the host 3100 through the power connector 3002. The auxiliary power supply 3230 may be supplied with power from the host 3100 and may be charged. The auxiliary power supply 3230 may supply the power of the SSD 3200 when the supply of power from the host 3100 is not smoothly performed. In an embodiment, the auxiliary power supply 3230 may be positioned inside the SSD 3200 or positioned outside the SSD 3200. For example, the auxiliary power supply 3230 may be disposed in a main board and may supply auxiliary power to the SSD 3200.

The buffer memory 3240 functions as a buffer memory of the SSD 3200. For example, the buffer memory 3240 may temporarily store data received from the host 3100 or data received from the plurality of flash memories 3221 to 322*n* or may temporarily store metadata (e.g., mapping tables) of the flash memories 3221 to 322*n*. The buffer memory 3240 may include volatile memories such as DRAM, SDRAM, DDR SDRAM, LPDDR SDRAM, and GRAM or nonvolatile memories such as FRAM, ReRAM, STT-MRAM, and PRAM.

Figure 18:
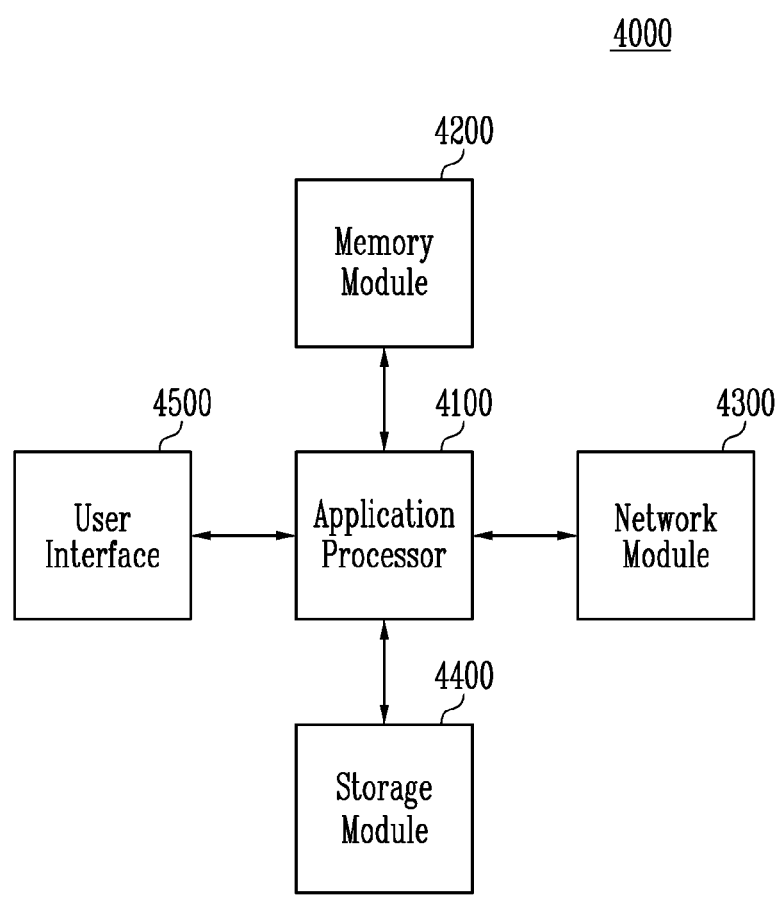
FIG. 18 is a block diagram illustrating a user system to which a memory system according to an embodiment of the present disclosure is applied.

FIG. 18 is a block diagram illustrating a user system to which a memory system according to an embodiment of the present disclosure is applied.

Referring to FIG. 18, a user system 4000 may include an application processor 4100, a memory module 4200, a network module 4300, a storage module 4400, and a user interface 4500.

The application processor 4100 may run components included in the user system 4000, an Operating System (OS) or a user program. In an embodiment, the application processor 4100 may include controllers, interfaces, graphic engines, etc. for controlling the components included in the user system 4000. The application processor 4100 may be provided as a system-on-chip (SoC).

The memory module 4200 may function as a main memory, a working memory, a buffer memory or a cache memory of the user system 4000. The memory module 4200 may include volatile RAMs such as DRAM, SDRAM, DDR SDRAM, DDR2 SDRAM, DDR3 SDRAM, LPDDR SDRAM, LPDDR2 SDRAM, and LPDDR3 SDRAM, or nonvolatile RAMs such as PRAM, ReRAM, MRAM, and FRAM. In an embodiment, the application processor 4100 and the memory module 4200 may be packaged based on package-on-package 3(POP) and may then be provided as a single semiconductor package.

The network module 4300 may communicate with external devices. For example, the network module 4300 may support wireless communication, such as Code Division Multiple Access (CDMA), Global System for Mobile communication (GSM), wideband CDMA (WCDMA), CDMA-2000, Time Division Multiple Access (TDMA), Long Term Evolution (LTE), WiMAX, WLAN, UWB, Bluetooth, or Wi-Fi communication. In an embodiment, the network module 4300 may be included in the application processor 4100.

The storage module 4400 may store data. For example, the storage module 4400 may store data received from the application processor 4100. Alternatively, the storage module 4400 may transmit the data stored in the storage module 4400 to the application processor 4100. In an embodiment, the storage module 4400 may be implemented as a nonvolatile semiconductor memory device, such as a Phase-change RAM (PRAM), a Magnetic RAM (MRAM), a Resistive RAM (RRAM), a NAND flash memory, a NOR flash memory, or a NAND flash memory having a three-dimensional (3D) structure. In an embodiment, the storage module 4400 may be provided as a removable storage medium (i.e., removable drive), such as a memory card or an external drive of the user system 4000.

In an embodiment, the storage module 4400 may include a plurality of nonvolatile memory devices, each of which may be operated in the same manner as the memory device 100 described above with reference to FIG. 1. The storage module 4400 may be operated in the same manner as the memory system 50 described above with reference to FIG. 1.

The user interface 4500 may include interfaces which input data or instructions to the application processor 4100 or output data to an external device. In an embodiment, the user interface 4500 may include user input interfaces such as a keyboard, a keypad, a button, a touch panel, a touch screen, a touch pad, a touch ball, a camera, a microphone, a gyroscope sensor, a vibration sensor, and a piezoelectric device. The user interface 4500 may further include user output interfaces such as a Liquid Crystal Display (LCD), an Organic Light Emitting Diode (OLED) display device, an Active Matrix OLED (AMOLED) display device, an LED, a speaker, and a monitor.

In accordance with the present disclosure, there are provided a memory controller, which can reduce the number of error bits in data read from a memory device, and a memory system including the memory controller.

What is claimed is:

1. A memory system, comprising:
   a memory device including a plurality of memory blocks;
   a buffer memory device including a read buffer configured to store data read from the memory device and a keep buffer configured to store part of the read data; and
   a memory controller configured to:
   control the memory device and the buffer memory device,
   store the data read from the memory device in the read buffer,
   identify keeping data from the data stored in the read buffer by determining whether a number of error bits in the data stored in the read buffer is greater than a preset first reference number of error bits,
   transfer the keeping data identified from the data stored in the read buffer from the read buffer to the keep buffer, and
   when information related to the keeping data satisfies a criteria, store the keeping data transferred to the keep buffer in any one of the plurality of memory blocks,
   wherein transferring the keeping data from the read buffer to the keep buffer includes storing, with the keeping data in the keep buffer, a logical address corresponding to the keeping data and information about a memory block of the plurality of memory blocks from which data corresponding to the keeping data was read.

2. The memory system according to claim 1, wherein the memory controller is configured to store buffer mapping information including:
   a read buffer address indicating an address of the data stored in the read buffer, and
   a keep buffer address indicating an address of the keeping data stored in the keep buffer, and
   wherein storing the data read from the memory device in the read buffer includes updating the buffer mapping information so that the read buffer address corresponding to the read data is stored in the buffer mapping information.

3. The memory system according to claim 2, wherein transferring the keeping data from the read buffer to the keep buffer includes transforming the read buffer address corresponding to the keeping data into a keep buffer address corresponding to the keeping data.

4. The memory system according to claim 1,
   wherein the memory controller is configured to store address mapping information that includes mapping relationships between logical addresses provided from a host and physical addresses indicating addresses of memory cells included in the plurality of memory blocks, and
   wherein storing the keeping data in any one of the plurality of memory blocks includes updating the address mapping information so that the logical address corresponding to the keeping data stored in the keep buffer is mapped to a physical address indicating an address of memory cells of the any one memory block in which the keeping data is stored.

5. The memory system according to claim 1,
   wherein the buffer memory device further comprises a write buffer configured to store data that a host has requested to be written, and
   wherein the memory controller is configured to remove the keeping data from the keep buffer when a logical address of the keeping data corresponds to a logical address of the data requested to be written.

6. The memory system according to claim 1, wherein the information related to the keeping data satisfies the criteria when a size of the keeping data stored in the keep buffer is greater than a preset size.

7. The memory system according to claim 1, wherein the information related to the keeping data satisfies the criteria when a preset time has elapsed since the keeping data was moved to the keep buffer.

8. The memory system according to claim 1, wherein the information related to the keeping data satisfies the criteria when the number of error bits included in the keeping data stored in the keep buffer is greater than a preset second reference number of error bits.

9. The memory system according to claim 1, wherein the memory controller is configured to:
  perform a test read operation using a test read voltage on the memory block from which the keeping data was read, and
  when a number of error bits greater than a preset third reference number of error bits are included in data read from the memory block by the test read operation, store the data stored in the memory block from which the keeping data was read in a memory block of the plurality of memory blocks different from the memory block from which the keeping data was read.

10. The memory system according to claim 1, wherein the read buffer and the keep buffer are implemented as different types of memories.

11. A memory controller for controlling a buffer memory device and a memory device including a plurality of memory blocks, the memory controller comprising:
  an operation controller configured to control the memory device to read data from the memory device in response to a request by a host to read the data;
  an error corrector configured to detect error bits included in the read data, and perform an error correction operation on the read data to produce error-corrected data; and
  a buffer controller configured to control the buffer memory device to:
  store the read data in a read buffer included in the buffer memory device,
  identify keeping data including a number of error bits greater than a reference number of error bits, from the data stored in the read buffer, and
  transfer the keeping data identified from the data stored in the read buffer from the read buffer to a keep buffer included in the buffer memory device; and
  the operation controller is further configured to:
  provide the error-corrected data to the host, and
  when information related to the keeping data satisfies a criteria, store the keeping data transferred to the keep buffer in any one of the plurality of memory blocks,
  wherein transferring the keeping data from the read buffer to the keep buffer includes storing, with the keeping data in the keep buffer, a logical address corresponding to the keeping data and information about a memory block of the plurality of memory blocks from which data corresponding to the keeping data was read.

12. The memory controller according to claim 11, wherein the buffer controller stores buffer mapping information including a read buffer address indicating an address of the data stored in the read buffer and a keep buffer address indicating an address of the keeping data stored in the keep buffer, and
  wherein storing the read data to the read buffer includes updating the buffer mapping information so that the read buffer address corresponding to the read data is stored in the buffer mapping information.

13. The memory controller according to claim 12, wherein transferring the keeping data from the read buffer to the keep buffer includes transforming the read buffer address corresponding to the keeping data stored in the buffer mapping information into a keep buffer address corresponding to the keeping data.

14. The memory controller according to claim 11, further comprising:
  a keeping data information storage configured to store the information related to the keeping data; and
  an address mapping information storage configured to store address mapping information that includes mapping relationships between logical addresses provided from the host and physical addresses indicating addresses of memory cells included in the plurality of memory blocks.

15. The memory controller according to claim 14, wherein the keeping data information storage stores at least one of information about a residual space of the keep buffer, information related to a time elapsed since storage of the keeping data in the keep buffer, and information about a number of error bits included in the keeping data.

16. The memory controller according to claim 14, wherein the information related to the keeping data satisfies the criteria when the information related to the keeping data exceeds a preset threshold value.

17. The memory controller according to claim 14, wherein storing the keeping data in the any one memory block includes updating the address mapping information in the address mapping information storage so that the logical address corresponding to the keeping data stored in the keep buffer is mapped to a physical address indicating an address of memory cells included in the any one memory block in which the keeping data is being stored.

18. The memory controller according to claim 11, wherein:
  the operation controller controls the memory device so that data requested by the host to be written is stored, and
  the buffer controller controls the buffer memory device so that when keeping data stored in the keep buffer has the same logical address as the logical address corresponding to the data requested to be written, the keeping data is removed from the keep buffer.

* * * * *